US012559410B2

(12) United States Patent (10) Patent No.: US 12,559,410 B2
Gross (45) Date of Patent: Feb. 24, 2026

(54) GLASS ARTICLES EXHIBITING HIGH COMPRESSIVE STRESS, AUTOMOTIVE INTERIOR SYSTEMS THAT INCLUDE SUCH GLASS ARTICLES AND METHODS FOR MAKING THE SAME

(71) Applicant: CORNING INCORPORATED, Corning, NY (US)

(72) Inventor: Timothy Michael Gross, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 909 days.

(21) Appl. No.: 17/296,812

(22) PCT Filed: Nov. 19, 2019

(86) PCT No.: PCT/US2019/062124
§ 371 (c)(1),
(2) Date: May 25, 2021

(87) PCT Pub. No.: WO2020/112432
PCT Pub. Date: Jun. 4, 2020

(65) Prior Publication Data
US 2022/0002186 A1 Jan. 6, 2022

Related U.S. Application Data

(60) Provisional application No. 62/773,480, filed on Nov. 30, 2018.

(51) Int. Cl.
*C03C 3/097* (2006.01)

(52) U.S. Cl.
CPC .................................... *C03C 3/097* (2013.01)

(58) Field of Classification Search
CPC .............................. C03C 3/097; C03C 21/002
See application file for complete search history.

(56) References Cited

U.S. PATENT DOCUMENTS 4,158,270 A * 6/1979 Cherbourg ............ E05F 11/535
49/352
4,536,480 A 8/1985 Flannery et al.
(Continued)

FOREIGN PATENT DOCUMENTS

JP 2008-115072 A 5/2008
JP 2013-520388 A 6/2013
(Continued)

OTHER PUBLICATIONS

International Search Report and Written Opinion of the International Searching Authority; PCT/US19/62124; Mailed Feb. 13, 2020; 10 Pages; European Patent Office.
(Continued)

*Primary Examiner* — Cameron K Miller
(74) *Attorney, Agent, or Firm* — William M. Johnson

(57) ABSTRACT

Embodiments of this disclosure pertain to glass articles with a glass composition including about 65 mol % or greater $SiO_2$; 8 mol % or greater $Al_2O_3$; from about 3.5 mol % to about 16 mol % $Na_2O$; up to about 5 mol % $P_2O_5$, and up to about 15 mol % ZnO. In one or more embodiments, the glass composition includes about 56% or greater $SiO_2$; about 8 mol % or greater $Al_2O_3$; from about 3.5 mol % to about 16 mol % $Na_2O$; up to about 1 mol % $P_2O_5$; and up to about 15 mol % ZnO. In some embodiments, the glass article exhibits a CS at a depth of greater than 30 micrometers of about 1 GPa or greater. Embodiments of an automotive interior system including such glass articles and methods of making glass articles are also disclosed.

17 Claims, 6 Drawing Sheets

Known strengthened aluminosilicate glass articles

(56) References Cited

U.S. PATENT DOCUMENTS

| 5,432,130 | A | 7/1995 | Rheinberger et al. |
| 8,854,623 | B2 | 10/2014 | Fontaine et al. |
| 2011/0019129 | A1* | 1/2011 | Nishizawa ........ G02F 1/133308 |
| | | | 349/64 |
| 2013/0011695 | A1 | 1/2013 | Yagi et al. |
| 2013/0186140 | A1 | 7/2013 | Brix et al. |
| 2013/0189486 | A1 | 7/2013 | Wang et al. |
| 2018/0079684 | A1 | 3/2018 | Hatano et al. |
| 2019/0062200 | A1* | 2/2019 | He ......................... C03C 3/078 |
| 2021/0107827 | A1* | 4/2021 | Xiao ..................... C03C 21/002 |

FOREIGN PATENT DOCUMENTS

| JP | 2014-001094 | A | | 1/2014 | |
| JP | 2015-527970 | A | | 9/2015 | |
| JP | 2016-538221 | A | | 12/2016 | |
| WO | WO-2012126394 | A1 | * | 9/2012 | ......... C03C 10/0036 |
| WO | 2013/130646 | A1 | | 2/2013 | |
| WO | 2015/077109 | A1 | | 5/2015 | |
| WO | 2016/087307 | A1 | | 6/2016 | |
| WO | 2018/074335 | A1 | | 4/2018 | |
| WO | 2018/129282 | A1 | | 7/2018 | |
| WO | 2018/144554 | A1 | | 8/2018 | |
| WO | 2018/152845 | A1 | | 8/2018 | |
| WO | 2019/105250 | A1 | | 6/2019 | |

OTHER PUBLICATIONS

ASTM Procedure D5767, "Standard Test Methods for Instrumental Measurements of Distinctness-of-Image Gloss of Coating Surfaces".

ASTM standard C770-16, entitled "Standard Test Method for Measurement of Glass Stress-Optical Coefficient,".

Japanese Patent Application No. 2021-530912, Office Action dated Oct. 18, 2023, 6 pages (English Translation only), Japanese Patent Office.

* cited by examiner

GLASS ARTICLES EXHIBITING HIGH COMPRESSIVE STRESS, AUTOMOTIVE INTERIOR SYSTEMS THAT INCLUDE SUCH GLASS ARTICLES AND METHODS FOR MAKING THE SAME

CROSS-REFERENCE TO RELATED APPLICATIONS

This application is a national stage application under 35 U.S.C. § 371 of International Application No. PCT/US2019/062124 filed on Nov. 19, 2019, which claims the benefit of priority under 35 U.S.C. § 119 of U.S. Provisional Application Ser. No. 62/773,480 filed on Nov. 30, 2018 the content of which is relied upon and incorporated herein by reference in its entirety.

BACKGROUND

The disclosure relates to strengthened glass articles exhibiting high compressive stress and automotive interior systems incorporating such articles, and more particularly to glass articles including a lithium-free glass compositions that can exhibit high compressive stress and automotive interior systems including such glass articles.

Automotive interiors systems can include flat and curved surfaces that incorporate displays and/or touch panel. The materials used to form cover glass for such surfaces are typically limited to polymers, which do not exhibit the durability and optical performance of glass. As such, glass articles are desirable, especially when used as covers for displays and/or touch panels. In addition, automotive interiors systems typically need to rigorous headform impact test (HIT) requirements. In some instances, the glass articles used in the automotive interiors systems should not break after being impacted in the headform impact test. Without being bound by theory, it is believed that glass articles that exhibit this performance require high compressive stress values at the surface and at certain depths from the surface. Higher compressive stress values also permit curving or bending of such glass articles for wide range of thicknesses. In some cases, tighter bend radii or higher bend-induced stresses may be achievable by providing glass articles with high compressive stress values.

Accordingly, there is a need for glass articles with properties that result in automotive interior systems exhibiting improved headform impact test performance, automotive interior systems that incorporate such glass articles and methods for forming such glass articles.

SUMMARY

A first aspect pertains to a glass article comprising a glass composition that is substantially free of $Li_2O$. In one or more embodiments, the glass composition includes $SiO_2$ in an amount of about 65 mol % or greater, $Al_2O_3$ in an amount of about 8 mol % or greater, $Na_2O$ in an amount from about 3.5 mol % to about 16 mol %, $P_2O_5$, and ZnO, wherein $P_2O_5$ is present in an amount up to about 5 mol %, and wherein ZnO is present in an amount up to about 15 mol %. In one or more embodiments, the glass composition includes $SiO_2$ in an amount of about 56 mol % or greater, $Al_2O_3$ in an amount of about 8 mol % or greater, $Na_2O$ in an amount from about 3.5 mol % to about 16 mol %, $P_2O_5$, and ZnO, wherein $P_2O_5$ is present in an amount up to about 1 mol %, and wherein ZnO is present in an amount up to about 15 mol %.

A second aspect of this disclosure pertains to a glass article comprising: a first major surface, a second major surface opposing the first major surface, a minor surface connecting the first major surface and the second major surface defining a thickness (t) (millimeters); a compressive stress (CS) region extending from the first major surface to a depth of compression (DOC), the CS region comprising a maximum CS magnitude ($CS_{max}$) of about 900 MPa or greater and a CS magnitude of 800 MPa or greater at a depth of about 10 micrometers; and a central tension (CT) region having a maximum CT magnitude ($CT_{max}$) disposed at a depth from the first major surface in a range from about 0.25 t to about 0.75 t, wherein the CS region and the CT region define a stress profile along the thickness. In one or more embodiments, the $CT_{max}$ magnitude is about 80 MPa or less.

A third aspect of this disclosure pertains to a curved glass article comprising a first major concave surface, a second major convex surface opposing the first major concave surface, a minor surface connecting the first major concave surface and the second major convex surface defining a thickness (t) (millimeters); the first major concave surface comprising a maximum radius of curvature of about 100 mm or greater and a first compressive stress (CS) region extending from the first major concave surface to a first depth of compressive stress ($DOC_1$), the first CS region having a first maximum CS value ($CS_{max1}$) of greater than about 800 MPa; the second major convex surface comprising a second CS region extending from the second major convex surface to a second depth of compressive stress ($DOC_2$), the second CS region having a second maximum CS value (CSmax2); a central tension (CT) region disposed between the first CS region and the second CS region having a maximum CT value ($CT_{curved-max}$), wherein the CS region and the CT region define a stress profile along the thickness; wherein $CSmax_2$ is less than $CSmax_1$. In one or more embodiments, $DOC_1$ differs from $DOC_2$.

A fourth aspect of this disclosure pertains to an automotive interior system comprising: a base; and a glass article according to one or more embodiments of the second aspect or third aspect disposed on the base, and wherein, when an impactor having a mass of 6.8 kg impacts the first major surface at an impact velocity of 5.35 m/s to 6.69 m/s, the deceleration of the impactor is 120 g (g-force) or less. In one or more embodiments, the deceleration of the impactor is not greater than 80 g for any 3 ms interval over a time of impact. In one or more embodiments, when the impactor breaks the glass article, the glass article ejects particles having a maximum dimension of 1 mm or less at a distance of 10 mm or less for the glass article.

A fifth aspect of this disclosure pertains to a method for forming a glass article comprising: strengthening a glass sheet having a first major surface, a second major surface, and a minor surface connecting the first major surface and the second major surface defining a thickness (t) to provide a first strengthened glass article according to one or more embodiments of the second aspect.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 2 is a side view of a glass article according to one or more embodiments.

DETAILED DESCRIPTION

Figure 1:
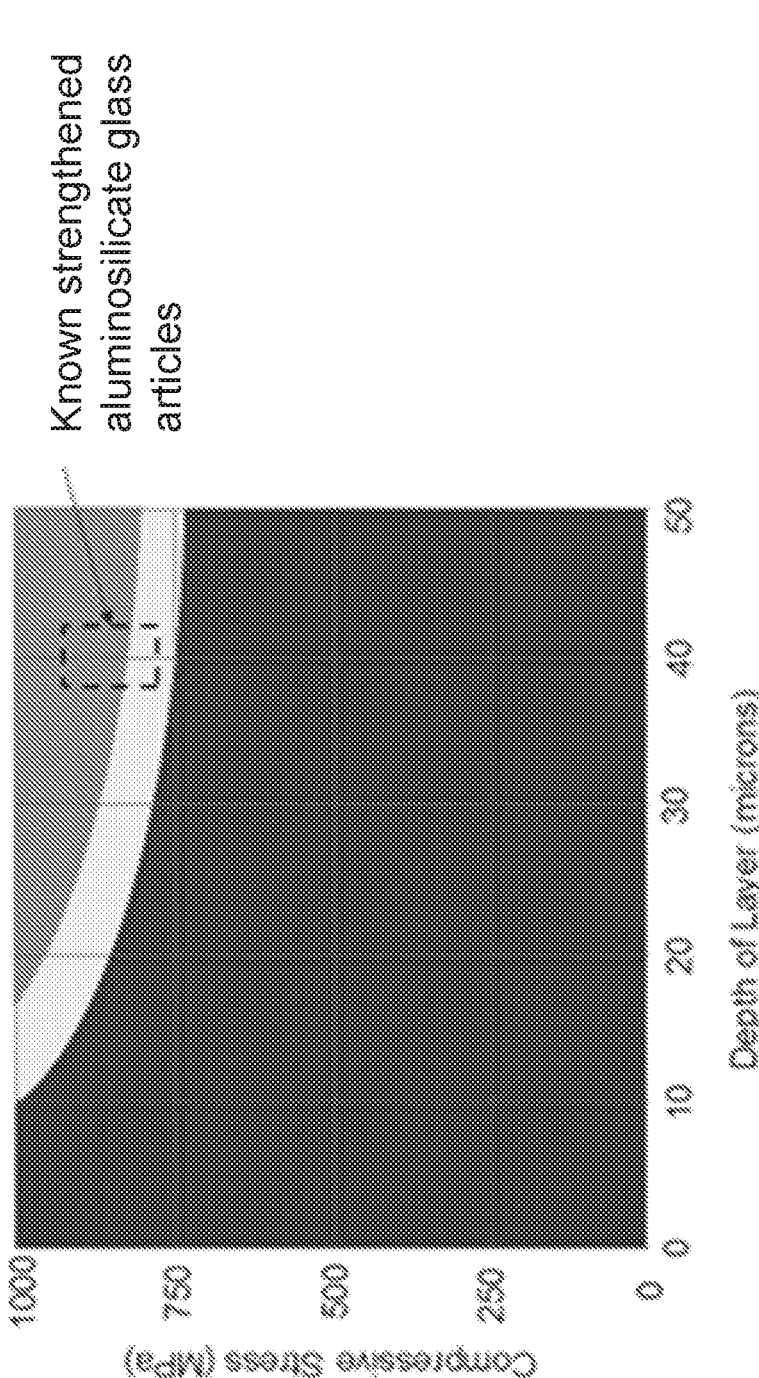
FIG. 1 is a chart showing compressive stress (MPa) as a function of depth of layer (DOL) (micrometers).

Reference will now be made in detail to various embodiments, examples of which are illustrated in the accompanying drawings.

As used herein, the term "glass article" is used in its broadest sense to include any object made wholly or partly of glass. Glass articles include laminates of glass and non-glass materials, laminates of glass and crystalline materials, and glass-ceramics (which include an amorphous phase and a crystalline phase). Unless otherwise specified, all glass compositions are expressed in terms of mole percent (mol %) on an oxide basis.

A "stress profile" is a plot of stress with respect to position of a glass article. A compressive stress (CS) region, where the glass article is under compressive stress, extends from a first surface to a depth of compression (DOC) of the article. A central tension region extends from the DOC into the central portion of the glass article and includes the region where the glass article is under tensile stress.

As used herein, depth of compression (DOC) refers to the depth at which the stress within the glass article changes from compressive to tensile stress. At the DOC, the stress crosses from a positive (compressive) stress to a negative (tensile) stress and thus exhibits a stress value of zero. According to the convention normally used in mechanical arts, compression is expressed as a negative ($<0$) stress and tension is expressed as a positive ($>0$) stress. Throughout this description, however, compressive stress (CS) and central tension (CT) is expressed as a positive or absolute value—i.e., as recited herein, CS=|CS| and CT=|CT|. Maximum central tension (maximum CT or $CT_{max}$) refers to the maximum tensile stress in the central tension region. Maximum compressive stress (maximum CS or $CT_{max}$) refers to the maximum CS stress in the CS region.

A "knee" of a stress profile is a depth of a glass article where the slope of the stress profile transitions from steep to gradual. The knee may refer to a transition area over a span of depths where the slope is changing.

As used herein, the terms "depth of exchange", "depth of layer" (DOL), "chemical depth of layer", and "depth of chemical layer" may be used interchangeably, describing in general the depth at which ion exchange facilitated by an ion exchange process (IOX) takes place for a particular ion. DOL refers to the depth within a glass article (i.e., the distance from a surface of the glass article to its interior region) at which an ion of a metal oxide or alkali metal oxide (e.g., the metal ion or alkali metal ion) diffuses into the glass article where the concentration of the ion reaches a minimum value, as determined by Glow Discharge—Optical Emission Spectroscopy (GD-OES)). In some embodiments, the DOL is given as the depth of exchange of the slowest-diffusing or largest ion introduced by an ion exchange (IOX) process.

Unless otherwise specified, CT and CS are expressed herein in megaPascals (MPa), thickness is express in millimeters and DOC and DOL are expressed in microns (micrometers).

CS at the surface is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

The maximum CT value is measured using a scattered light polariscope (SCALP) technique known in the art.

DOC may be measured by FSM or SCALP depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth (or DOL) of potassium ions in such glass articles is measured by FSM.

Refracted near-field (RNF) method may also be used to measure attributes of the stress profile. When the RNF method is utilized, the maximum CT value provided by SCALP is utilized. In particular, the stress profile measured by the RNF method is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50 mol % of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

As used herein, the phrase "headform impact" or "headform impact test" refers to U.S. DEPARTMENT OF TRANSPORTATION NATIONAL HIGHWAY TRAFFIC SAFETY ADMINISTRATION LABORATORY TEST PROCEDURE FOR FMVSS 201U Occupant Protection in Interior Impact Upper Interior Head Impact Protection.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. As used herein, the phrase "substantially free" with respect to the components of the composition means that the component is not actively or intentionally added to the composition during initial batching, but may be present as an impurity in an amount less than about 0.001 mol %.

Aspects of this disclosure pertains to glass articles that are suitable for use as cover glass in automotive interiors systems or foldable displays for consumer electronics. The phrase "automotive interiors" includes the interiors of trains, automobiles (e.g., cars, trucks, buses and the like), seacraft (boats, ships, submarines, and the like), and aircraft (e.g., drones, airplanes, jets, helicopters and the like). The phrase "consumer electronics" includes mobile phones, smart phones tablets, wearable devices, video game consoles, cameras, video players, virtual reality head mounted displays, smart home devices, and the like. In one or more embodiments, the glass articles may be used in a curved or folded configuration.

Figure 5:
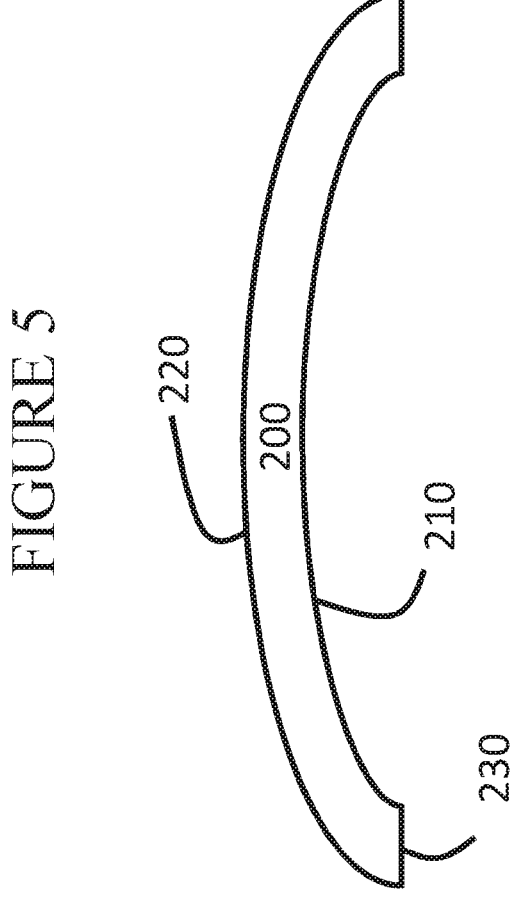
FIG. 5 is a side view of a curved glass article according to one or more embodiments.

The glass articles may be curved into a curved shape or configuration using hot forming methods known in the art or may be cold-bent. As used herein, the terms "cold-bent," or "cold-bending" refers to curving the glass article at a cold-bend temperature which is less than the softening point of the glass. Often, the cold-bend temperature is room temperature. The term "cold-bendable" refers to the capability of a glass article to be cold-bent. A feature of a cold-bent glass article is asymmetric surface compressive stress between the first major surface 210 and the second major surface 220 (as shown in FIG. 5). In one or more embodiments, prior to the cold-bending process or being cold-bent, the respective compressive stresses in the first major surface 210 and the second major surface 220 of the glass article are substantially equal. In one or more embodiments in which the glass article is unstrengthened, the first major surface 210 and the second major surface 220 exhibit no appreciable compressive stress, prior to cold-bending. In one or more embodiments in which the glass article is strengthened (as described herein), the first major surface 210 and the second major surface 220 exhibit substantially equal compressive stress with respect to one another, prior to cold-bending. In one or more embodiments, after cold-bending, the CS on the surface having a concave shape after cold-bending (e.g., first major surface 210) increases, while the CS on the surface having a convex shape after cold-bending (e.g., the second major surface 220) decreases. In other words, the compressive stress on the concave surface (e.g., first major surface 210) is greater after cold-bending than before cold-bending. Without being bound by theory, the cold-bending process increases the compressive stress of the glass article being shaped to compensate for tensile stresses imparted during cold-bending. In one or more embodiments, the cold-bending process causes the concave surface (second major surface 220) to experience compressive stresses, while the surface forming a convex shape (i.e., the second major surface 220 in FIG. 5) after cold-bending experiences tensile stresses. The tensile stress experienced by the convex (i.e., the second major surface 220 following cold-bending results in a net decrease in surface compressive stress, such that the compressive stress in convex surface (i.e., the second major surface 220) of a strengthened glass article following cold-bending is less than the compressive stress on the same surface (i.e., second major surface 220) when the glass article is flat.

The phrase cold-bent or cold-bending also includes folding a glass article into a folded configuration at a cold-bend temperature.

As used herein, thickness (t) as used herein refers to the maximum thickness of the glass article.

In known glass articles, a stress profile may be generated by a chemical strengthening processes and can have an error function profile shape. In such known glass articles, the CT region includes a maximum central tension magnitude that, when the glass article is curved, causes the automotive interior system to exhibit poor headform impact test performance. In addition, such known glass articles tend break in the headform impact tests.

In some instances, the known glass articles are cold-bent to have a curved shape and such cold-bending causes the maximum CT magnitude to increase to unacceptably high value, when the CT generated from strengthening is superimposed on the cold-bend induced stresses.

Aspects of this disclosure pertain to strengthened glass articles that have stress profiles that, when cold-bent, result in a significantly lower maximum central tension magnitude than known glass articles with typical complementary error function stress profiles.

The maximum bend induced stress is given by Equation (1):

$$\sigma_{max} = (E/1 - v^2)^*(t/2)^*(1/R),\qquad\text{Equation (1)}$$

where E is Young's modulus, v is Poisson's ratio, t is thickness, and R is bend radius.

The stress through the thickness of a glass article is given by Equation (2):

$$\sigma = \sigma_{max} - (\sigma_{max}/(t/2))\qquad\text{Equation (2)}$$

This expression shows that the tensile stress is greatest on the surface and decreases linearly to the center of the glass. When the cold-bending a strengthened glass article, this bend induced stress is superimposed with the stress profile imparted from strengthening (e.g., by chemical strengthening processes, such as ion exchange). If the magnitude of the maximum CT from the strengthening is near or closer to a major surface (as it is with complementary error function profiles), the resultant magnitude of the maximum CT following cold-bending becomes very high since the bend induced tension is also greatest near the major surface.

As will be described in terms of the various embodiments of the glass article described herein, if the magnitude of the maximum CT from strengthening is positioned toward center of the glass article, the resultant magnitude of the maximum CT following cold-bending is substantially lower. Such curved glass articles exhibit superior headform impact test performance, and may achieve smaller or tighter bend radii (or higher bend induced stresses). In particular, maintaining the magnitude of the maximum CT of such curved glass articles to a lower value reduces or prevents fragmentation behavior of the glass article at failure, and results in improved headform impact performance.

The glass compositions used in such glass articles often include $Li_2O$; however, it may be desirable to use glass compositions that are substantially free of $Li_2O$ and are capable of exhibiting surface compressive stresses exceeding 1 GPa, and/or exhibiting compressive stresses exceeding 1 GPa at a DOL greater than 30 micrometers from a major surface of the glass article. Such values of compressive stress at the surface or at DOL greater than 30 micrometers from a major surface enable management of stresses when the glass article is curved by folding or cold-bending or is impacted (which can cause local bending). This is especially important because such events (folding, cold-bending, impacting) cause superposition of existing stresses in the glass article with mechanically induced stresses. Accordingly, embodiments of the glass article described herein remain in compression to a sufficient depth from a major surface that is ideally greater than flaw depth.

FIG. 1 shows a chart plotting compressive stress (in MPa) as a function of DOL (in micrometers) from a major surface of a chemically strengthened glass article. As shown in FIG. 1, desirable glass articles have sufficiently high compressive stresses at deeper DOL values are more likely to survive the headform impact test. One or more embodiments of the glass article described herein exhibit more 850 MPa or more than 1 GPa compressive stress values at a DOL of 30 micrometers or greater, and are thus likely to only exhibit headform impact test failures when large flaws are present. In contrast, known strengthened aluminosilicate glass articles that are strengthened using the same process as the embodiments of the glass articles of this disclosure exhibit substantially lower compressive stresses values at DOL of greater than 30 micrometers. Such known glass at tend to exhibit about 20 mol % headform impact test failures (when the test is performed at or near the center of major surface of the glass article).

A first aspect of this disclosure pertains to glass articles including a glass composition that is substantially free of $Li_2O$. One or more embodiments of such glass articles are capable of strengthening to exhibit high surface compressive stresses and high compressive stress at DOL values of greater than 30 microns. For example, such glass articles may exhibit a compressive stress value of 800 MPa or greater, 850 MPa or greater, 900 MPa or greater, 950 MPa or greater, or 1 GPa or greater at such DOL values. Furthermore, in one or more embodiments, the glass composition is fusion-formable. For example, such glass compositions exhibit a zircon breakdown temperature less than 35 kP and a liquidus viscosity greater than 100 kP.

Without being bound by theory, when comparing such glass compositions with other glass compositions that are substantially $Li_2O$-free and are fusion formable (i.e., exhibit zircon breakdown temperature less than 35 kP and a liquidus viscosity greater than 100 kP), the glass compositions described herein exhibit greater compressive stress (at the surface and DOL of greater than 30 micrometers) and greater diffusivity.

In one or more embodiments, the glass article has a glass composition that includes $SiO_2$ in an amount of about 56 mol % or greater (or 65 mol % or greater), $Al_2O_3$ in an amount of about 8 mol % or greater; $Na_2O$ in an amount from about 3.5 mol % to about 16 mol %; $P_2O_5$; and ZnO. In one or more embodiments, $P_2O_5$ is present in an amount up to about 1 mol % or up to about 5 mol %. In one or more embodiments, ZnO is present in an amount up to about 15 mol %.

In one or more embodiments, the glass composition includes $SiO_2$ in an amount in the range from about 56 mol % to about 80 mol %, from about 58 mol % to about 80 mol %, from about 60 mol % to about 80 mol %, from about 62 mol % to about 80 mol %, from about 64 mol % to about 80 mol %, from about 65 mol % to about 80 mol %, from about 66 mol % to about 80 mol %, from about 68 mol % to about 80 mol %, from about 70 mol % to about 80 mol %, from about 56 mol % to about 79 mol %, from about 56 mol % to about 78 mol %, from about 56 mol % to about 77 mol %, from about 56 mol % to about 76 mol %, from about 65 mol % to about 78 mol %, from about 65 mol % to about 77 mol %, from about 65 mol % to about 76 mol %, from about 65 mol % to about 75 mol %, from about 65 mol % to about 74 mol %, from about 65 mol % to about 72 mol %, from about 65 mol % to about 70 mol %, from about 65 mol % to about 68 mol %, and all ranges and sub-ranges therebetween.

In one or more embodiments, the glass composition includes $Al_2O_3$ in an amount greater than about 7 mol %, greater than about 8 mol %, or greater than about 10 mol %. In one or more embodiments, the glass composition includes $Al_2O_3$ in a range from about 8 mol % to about 24 mol %, from about 9 mol % to about 24 mol %, from about 10 mol % to about 24 mol %, from about 11 mol % to about 24 mol %, from about 12 mol % to about 24 mol %, from about 14 mol % to about 24 mol %, from about 15 mol % to about 24 mol %, from about 16 mol % to about 24 mol %, from about 18 mol % to about 24 mol %, from about 20 mol % to about 24 mol %, from about 8 mol % to about 22 mol %, from about 8 mol % to about 20 mol %, from about 8 mol % to about 18 mol %, from about 8 mol % to about 16 mol %, from about 8 mol % to about 15 mol %, from about 8 mol % to about 14 mol %, from about 8 mol % to about 12 mol %, from about 10 mol % to about 15 mol %, or from about 10 mol % to about 14 mol %, and all ranges and sub-ranges therebetween.

In one or more embodiments, the glass composition comprises a non-zero amount of $P_2O_5$ up to about 5 mol % or up to about 2 mol %. In one or more embodiments, the glass composition comprises $P_2O_5$ in an amount in a range from about 0.01 mol % to about 5 mol %, from about 0.01 mol % to about 4.5 mol %, from about 0.01 mol % to about 4 mol %, from about 0.01 mol % to about 3.5 mol %, from about 0.01 mol % to about 3 mol %, from about 0.01 mol % to about 2.5 mol %, from about 0.01 mol % to about 2 mol %, from about 0.01 mol % to about 1.8 mol %, from about 0.01 mol % to about 1.6 mol %, from about 0.01 mol % to about 1.5 mol %, from about 0.01 mol % to about 1.4 mol %, from about 0.01 mol % to about 1.2 mol %, from about 0.01 mol % to about 1 mol %, from about 0.1 mol % to about 5 mol %, from about 0.1 mol % to about 4.8 mol %, from about 0.1 mol % to about 4.6 mol %, from about 0.1 mol % to about 4.5 mol %, from about 0.1 mol % to about 4.4 mol %, from about 0.1 mol % to about 4.2 mol %, from about 0.1 mol % to about 4 mol %, from about 0.1 mol % to about 3.8 mol %, from about 0.1 mol % to about 3.6 mol %, from about 0.1 mol % to about 3.5 mol %, from about 0.1 mol % to about 3.4 mol %, from about 0.1 mol % to about 3.2 mol %, from about 0.1 mol % to about 3 mol %, from about 0.1 mol % to about 2.8 mol %, from about 0.1 mol % to about 2.6 mol %, from about 0.1 mol % to about 2.5 mol %, from about 0.1 mol % to about 2.4 mol %, from about 0.1 mol % to about 2.2 mol %, from about 0.1 mol % to about 2 mol %, from about 0.1 mol % to about 1.8 mol %, from about 0.1 mol % to about 1.6 mol %, from about 0.1 mol % to about 1.5 mol %, from about 0.1 mol % to about 1.4 mol %, from about 0.1 mol % to about 1.2 mol %, from about 0.1 mol % to about 1 mol %, from about 0.2 mol % to about 5 mol %, from about 0.2 mol % to about 4.8 mol %, from about 0.2 mol % to about 4.6 mol %, from about 0.2 mol % to about 4.5 mol %, from about 0.2 mol % to about 4.4 mol %, from about 0.2 mol % to about 4.2 mol %, from about 0.2 mol % to about 4 mol %, from about 0.2 mol % to about 3.8 mol %, from about 0.2 mol % to about 3.6 mol %, from about 0.2 mol % to about 3.5 mol %, from about 0.2 mol % to about 3.4 mol %, from about 0.2 mol % to about 3.2 mol %, from about 0.2 mol % to about 3 mol %, from about 0.2 mol % to about 2.8 mol %, from about 0.2 mol % to about 2.6 mol %, from about 0.2 mol % to about 2.5 mol %, from about 0.2 mol % to about 2.4 mol %, from about 0.2 mol % to about 2.2 mol %, from about 0.2 mol % to about 2 mol %, from about 0.2 mol % to about 1.8 mol %, from about 0.2 mol % to about 1.6 mol %, from about 0.2 mol % to about 1.5 mol %, from about 0.2 mol % to about 1.4 mol %, from about 0.2 mol % to about 1.2 mol %, or from about 0.2 mol % to about 1 mol %, and all ranges and sub-ranges therebetween.

In one or more embodiments, the glass composition may include a non-zero total amount of RO up to about 28 mol %. In one or more embodiments, the glass composition comprises RO in an amount from about 0.01 mol % to about 28 mol %, from about 0.01 mol % to about 26 mol %, from about 0.01 mol % to about 25 mol %, from about 0.01 mol % to about 24 mol %, from about 0.01 mol % to about 22 mol %, from about 0.01 mol % to about 20 mol %, from about 0.01 mol % to about 18 mol %, from about 0.01 mol % to about 16 mol %, from about 0.01 mol % to about 15 mol %, from about 0.01 mol % to about 14 mol %, from about 0.01 mol % to about 12 mol %, from about 0.01 mol % to about 10 mol %, from about 1 mol % to about 28 mol %, from about 2 mol % to about 28 mol %, from about 4 mol % to about 28 mol %, from about 5 mol % to about 28 mol %, from about 6 mol % to about 28 mol %, from about 8 mol % to about 28 mol %, from about 10 mol % to about 28 mol %, from about 2 mol % to about 15 mol %, from about 5 mol % to about 15 mol %, or from about 4 mol % to about 10 mol %, and all ranges and sub-ranges therebetween.

In one or more embodiments, the glass composition includes CaO in an amount about 5 mol % or less, about 4.5 mol % or less, about 4 mol % or less, about 3.5 mol % or less, about 3 mol % or less, about 2.5 mol % or less, about 2 mol % or less, about 1.5 mol % or less, or about 1 mol % or less. In one or more embodiments, the glass composition is substantially free of CaO.

In some embodiments, the glass composition comprises MgO in an amount in the range from about 0 mol % to about 13 mol %, from about 0 mol % to about 12 mol %, from about 0 mol % to about 10 mol %, from about 0 mol % to about 8 mol %, from about 0 mol % to about 6 mol %, from about 0 mol % to about 5 mol %, from about 0 mol % to about 4 mol %, from about 0 mol % to about 2 mol %, or from about 0 mol % to about 1 mol %, and all ranges and sub-ranges therebetween.

In some embodiments, the glass composition comprises a non-zero amount of ZnO in up to about 15 mol %. In one or more embodiments, the glass composition comprises ZnO in an amount from about 0.01 mol % to about 15 mol %, from about 0.01 mol % to about 14 mol %, from about 0.01 mol % to about 12 mol %, from about 0.01 mol % to about 10 mol %, from about 0.01 mol % to about 8 mol %, from about 0.01 mol % to about 6 mol %, from about 0.01 mol % to about 5 mol %, from about 0.01 mol % to about 4 mol %, from about 0.01 mol % to about 2 mol %, from about 0.1 mol % to about 15 mol %, from about 0.1 mol % to about 14 mol %, from about 0.1 mol % to about 12 mol %, from about 0.1 mol % to about 10 mol %, from about 0.1 mol % to about 8 mol %, from about 0.1 mol % to about 6 mol %, from about 0.1 mol % to about 5 mol %, from about 0.1 mol % to about 4 mol %, from about 0.1 mol % to about 2 mol %, from about 1 mol % to about 15 mol %, from about 1 mol % to about 14 mol %, from about 1 mol % to about 12 mol %, from about 1 mol % to about 10 mol %, from about 1 mol % to about 8 mol %, from about 1 mol % to about 6 mol %, from about 1 mol % to about 5 mol %, from about 1 mol % to about 4 mol %, from about 1 mol % to about 2 mol %, from about 2 mol % to about 10 mol %, from about 2 mol % to about 8 mol %, from about 2 mol % to about 6 mol %, or from about 2 mol % to about 5 mol %, and all ranges and sub-ranges therebetween.

In some embodiments, the glass composition comprises SrO in an amount in the range from about 0 mol % to about 12 mol %, from about 0 mol % to about 11.5 mol %, from about 0 mol % to about 11 mol %, from about 0 mol % to about 10 mol %, from about 0 mol % to about 8 mol %, from about 0 mol % to about 6 mol %, from about 0 mol % to about 5 mol %, from about 0 mol % to about 4 mol %, from about 0 mol % to about 3 mol %, from about 0 mol % to about 2 mol %, from about 0 mol % to about 1 mol %, from about 0.01 mol % to about 5 mol %, or from about 0.1 mol % to about 2 mol %, and all ranges and sub-ranges therebetween.

In one or more embodiments, the glass composition may include a total amount of $R_2O$ that is greater than or equal to about 5 mol %, greater than or equal to about 10 mol %, or greater than or equal to about 12 mol %. In some embodiments, the glass composition includes a total amount of $R_2O$ in a range from 5 mol % to about 24 mol %, from about 6 mol % to about 24 mol %, from about 8 mol % to about 24 mol %, from about 10 mol % to about 24 mol %, from about 12 mol % to about 24 mol %, from 13 mol % to about 24 mol %, from 14 mol % to about 24 mol %, from 15 mol % to about 24 mol %, from 16 mol % to about 24 mol %, from about 17 mol % to about 24 mol %, from 18 mol % to about 24 mol %, from about 20 mol % to about 24 mol %, from about 13 mol % to about 22 mol %, from about 13 mol % to about 20 mol %, from about 13 mol % to about 18 mol %, from about 14 mol % to about 17 mol %, from about 13 mol % to about 16 mol %, 13 mol % to about 15 mol %, from 17 mol % to about 21 mol %, from 18 mol % to about 20 mol %, or from 19 mol % to about 21 mol %, and all ranges and sub-ranges therebetween. In one or more embodiments, the glass composition may be substantially free of $Li_2O$, $Rb_2O$, or $Cs_2O$ or any two or any three of $Li_2O$, $Rb_2O$ and $Cs_2O$.

In one or more embodiments, the glass composition may include $R_2O$, which may include the total amount of $Na_2O$ and $K_2O$ only (i.e., the glass composition is substantially free of $Li_2O$, $Rb_2O$ and $Cs_2O$). In one or more embodiments, the glass composition may comprise at least one alkali metal oxide selected from $Na_2O$, $K_2O$, $Rb_2O$, and $Cs_2O$, wherein the alkali metal oxide is present in an amount greater than about 5 mol %, greater than about 8 mol %, greater than about 10 mol %, or greater than about 12 mol %. In such embodiments, the glass composition or glass article formed therefrom may be characterized as an alkali aluminosilicate glass due to the presence of an alkali metal oxide.

In one or more embodiments, the glass composition comprises $Na_2O$ in an amount greater than or equal to about 10 mol %, greater than or equal to about 11 mol %, greater than or equal to about 12 mol %, or greater than or equal to about 14 mol %. In one or more embodiments, the composition includes $Na_2O$ in a range from about from about 3 mol % to about 18 mol %, from about 3.5 mol % to about 18 mol %, from about 4 mol % to about 18 mol %, from about 5 mol % to about 18 mol %, from about 6 mol % to about 18 mol %, from about 8 mol % to about 18 mol %, from about 10 mol % to about 18 mol %, from about 12 mol % to about 18 mol %, from about 14 mol % to about 18 mol %, from about 15 mol % to about 18 mol %, from about 3 mol % to about 16 mol %, from about 3 mol % to about 15 mol %, from about 3 mol % to about 14 mol %, from about 3 mol % to about 12 mol %, from about 3 mol % to about 10 mol %, or from about 13.5 mol % to about 16.5 mol %, and all ranges and sub-ranges therebetween.

In one or more embodiments, the glass composition includes less than about 15 mol % $K_2O$, less than about 10 mol % $K_2O$, less than about 5 mol % $K_2O$, less than about 2 mol % $K_2O$, or less than about 1 mol % $K_2O$. In some instances, the glass composition may include $K_2O$ in an amount in a range from about from about 0 mol % to about 15 mol %, from about 0 mol % to about 14 mol %, from about 0 mol % to about 12 mol %, from about 0 mol % to about 11 mol %, from about 0 mol % to about 10 mol %, from about 0 mol % to about 8 mol %, from about 0 mol % to about 6 mol %, from about 0 mol % to about 5 mol %, from about 0 mol % to about 4 mol %, from about 0 mol % to about 2 mol %, from about 0 mol % to about 1 mol %, from about 0 mol % to about 0.5 mol %, from about 0.01 mol % to about 15 mol %, from about 0.01 mol % to about 14 mol %, from about 0.01 mol % to about 12 mol %, from about 0.01 mol % to about 11 mol %, from about 0.01 mol % to about 10.01 mol %, from about 0.01 mol % to about 8 mol %, from about 0.01 mol % to about 6 mol %, from about 0.01 mol % to about 5 mol %, from about 0.01 mol % to about 4 mol %, from about 0.01 mol % to about 2 mol %, from about 0.01 mol % to about 1 mol %, or from 0.1 to about 0.5 mol %, and all ranges and sub-ranges therebetween.

In one or more embodiments, the glass composition comprises $SnO_2$ in an amount equal to or less than about 1 mol %, less than about 0.75 mol %, less than about 0.5 mol %, less than about 0.25 mol %, less than about 0.15 mol %, or about 0.1 mol % or less. In one or more embodiments, the glass composition comprises $SnO_2$ in a range from about 0.01 mol % to about 0.5 mol %, from about 0.01 mol % to about 0.4 mol %, from about 0.01 mol % to about 0.3 mol %, from about 0.01 mol % to about 0.2 mol %, or from about 0.01 mol % to about 0.1 mol %, and all ranges and sub-ranges therebetween. In some embodiments, $SnO_2$ may be substituted with another fining agent is a multivalent or other oxygen absorbing agent such as antimony, arsenic, iron, cerium, and the like.

Figure 2:
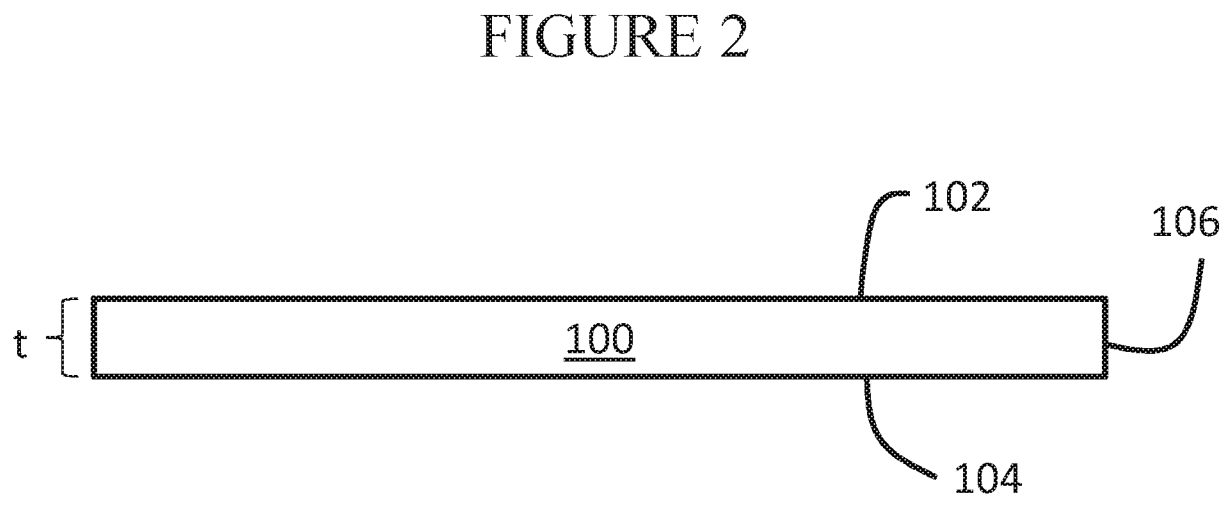

A second aspect of this disclosure pertains to a glass article 100 that includes a first major surface 102, a second major surface 104 opposing the first major surface, a minor surface 106 connecting the first major surface and the second major surface defining a thickness (t) (millimeters), as illustrated in FIG. 2. In one or more embodiments, the glass article is in a substantially flat configuration (e.g., having a radius of curvature of about 5000 mm or greater) or a permanently curved configuration. The glass article 100 may have a glass composition as described in accordance with one or more embodiments of the first aspect. In one or more embodiments, the glass article 100 may be cold-bent into a curved configuration.

Figure 3:
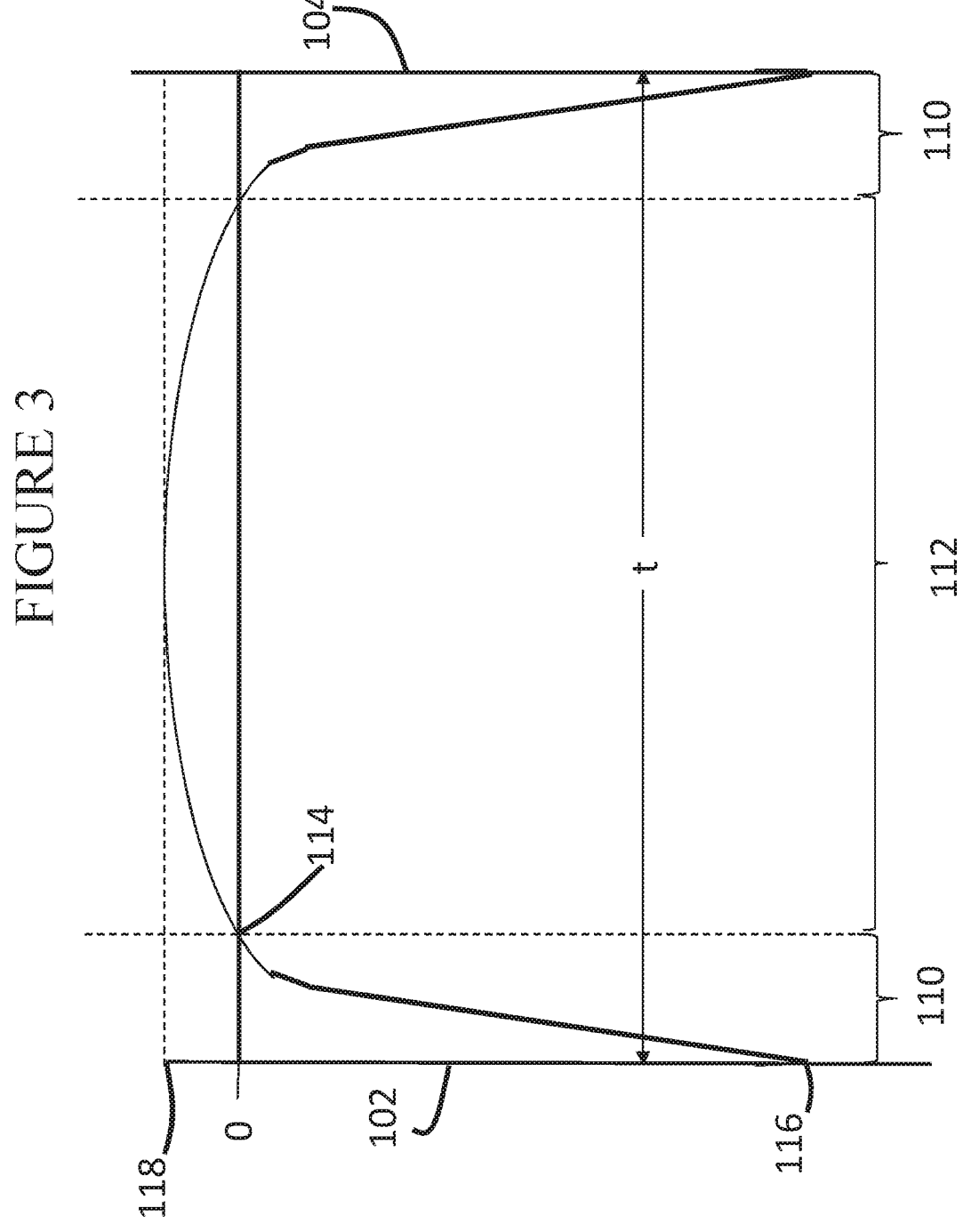
FIG. 3 is an exemplary stress profile of the glass article shown in FIG. 2.

As illustrated in FIG. 3, the glass article has a CS region 110, extending from the first major surface 102 to a first depth of compression ($DOC_1$) 114. The CS region includes a maximum CS magnitude ($CS_{max}$) 116. The glass article has a CT region 112 disposed in the central region. In the embodiment shown, the CT region extends from the DOC to an opposing CS region 110. The CT region defines a maximum CT magnitude ($CT_{max}$) 118. The CS region and the CT region define a stress profile that extends along the thickness of the glass article.

In one or more embodiments, the glass article may be strengthened mechanically by utilizing a mismatch of the coefficient of thermal expansion between portions of the article to create a compressive stress region and a central region exhibiting a tensile stress. In some embodiments, the glass article may be strengthened thermally by heating the glass to a temperature above the glass transition point and then rapidly quenching.

In one or more embodiments, the glass article may be chemically strengthening by ion exchange. In the ion exchange process, ions at or near the surface of the glass article are replaced by—or exchanged with—larger ions having the same valence or oxidation state. In those embodiments in which the glass article comprises an alkali aluminosilicate glass, ions in the surface layer of the article and the larger ions are monovalent alkali metal cations, such as Li+, Na+, K+, Rb+, and Cs+. Alternatively, monovalent cations in the surface layer may be replaced with monovalent cations other than alkali metal cations, such as Ag+ or the like. In such embodiments, the monovalent ions (or cations) exchanged into the glass article generate a stress.

Ion exchange processes are typically carried out by immersing a glass article in one or more molten salt baths containing the larger ions to be exchanged with the smaller ions in the glass article. It should be noted that aqueous salt baths may also be utilized. In addition, the composition of the bath(s) may include more than one type of larger ion (e.g., Na+ and K+) or a single larger ion. It will be appreciated by those skilled in the art that parameters for the ion exchange process, including, but not limited to, bath composition and temperature, immersion time, the number of immersions of the glass article in a salt bath (or baths), use of multiple salt baths, additional steps such as annealing, washing, and the like, are generally determined by the composition of the glass article (including the structure of the article and any crystalline phases present) and the desired CS, DOC and CT values of the glass article that results from strengthening. Exemplary molten bath composition may include nitrates, sulfates, and chlorides of the larger alkali metal ion. Typical nitrates include KNO3, NaNO3, LiNO3, NaSO4 and combinations thereof. The temperature of the molten salt bath typically is in a range from about 380° C. up to about 450° C., while immersion times range from about 15 minutes up to about 100 hours depending on glass article thickness, bath temperature and glass (or monovalent ion) diffusivity. However, temperatures and immersion times different from those described above may also be used.

In one or more embodiments, the glass articles may be immersed in a molten salt bath of 100% NaNO3, 100% KNO3, or a combination of NaNO3 and KNO3 having a temperature from about 370° C. to about 480° C. In some embodiments, the glass article may be immersed in a molten mixed salt bath including from about 1% to about 99% KNO3 and from about 1% to about 99% NaNO3. In one or more embodiments, the glass article may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass article may be immersed in a molten, mixed salt bath including NaNO3 and KNO3 (e.g., 49%/51%, 50%/50%, 51%/49%) having a temperature less than about 420° C. (e.g., about 400° C. or about 380° C.). for less than about 5 hours, or even about 4 hours or less. In one or more embodiments, the glass article is immersed in a first mixed molten salt bath (e.g., 75% KNO3/25% NaNO3) having a temperature of 430° C. for 8 hours, and then immersed in a second pure molten salt bath of KNO3 having a lower temperature than the first mixed molten salt bath for a shorter duration (e.g., about 4 hours).

Ion exchange conditions can be tailored to provide a "spike" or to increase the slope of the stress profile at or near the surface of the resulting glass article. The spike may result in a greater surface CS value. This spike can be achieved by single bath or multiple baths, with the bath(s) having a single composition or mixed composition, due to the unique properties of the glass compositions used in the glass articles described herein.

In one or more embodiments, where more than one monovalent ion is exchanged into the glass article, the different monovalent ions may exchange to different depths within the glass article (and generate different magnitudes stresses within the glass article at different depths). The resulting relative depths of the stress-generating ions can be determined and cause different characteristics of the stress profile.

In one or more embodiments, the glass article has a CSmax that is about 900 MPa or greater, about 920 MPa or greater, about 940 MPa or greater, about 950 MPa or greater, about 960 MPa or greater, about 980 MPa or greater, about 1000 MPa or greater, about 1020 MPa or greater, about 1040 MPa or greater, about 1050 MPa or greater, about 1060 MPa or greater, about 1080 MPa or greater, about 1100 MPa or greater, about 1120 MPa or greater, about 1140 MPa or greater, about 1150 MPa or greater, about 1160 MPa or greater, about 1180 MPa or greater, about 1200 MPa or greater, about 1220 MPa or greater, about 1240 MPa or greater, about 1250 MPa or greater, about 1260 MPa or greater, about 1280 MPa or greater, or about 1300 MPa or greater. In one or more embodiments, the CSmax is in a range from about 900 MPa to about 1500 MPa, from about 920 MPa to about 1500 MPa, from about 940 MPa to about 1500 MPa, from about 950 MPa to about 1500 MPa, from about 960 MPa to about 1500 MPa, from about 980 MPa to about 1500 MPa, from about 1000 MPa to about 1500 MPa, from about 1020 MPa to about 1500 MPa, from about 1040 MPa to about 1500 MPa, from about 1050 MPa to about 1500 MPa, from about 1060 MPa to about 1500 MPa, from about 1080 MPa to about 1500 MPa, from about 1100 MPa to about 1500 MPa, from about 1120 MPa to about 1500 MPa, from about 1140 MPa to about 1500 MPa, from about 1150 MPa to about 1500 MPa, from about 1160 MPa to about 1500 MPa, from about 1180 MPa to about 1500 MPa, from about 1200 MPa to about 1500 MPa, from about 1220 MPa to about 1500 MPa, from about 1240 MPa to about 1500 MPa, from about 1250 MPa to about 1500 MPa, from about 1260 MPa to about 1500 MPa, from about 1280 MPa to about 1500 MPa, from about 1300 MPa to about 1500 MPa, from about 900 MPa to about 1480 MPa, from about 900 MPa to about 1460 MPa, from about 900 MPa to about 1450 MPa, from about 900 MPa to about 1440 MPa, from about 900 MPa to about 1420 MPa, from about 900 MPa to about 1400 MPa, from about 900 MPa to about 1380 MPa, from about 900 MPa to about 1360 MPa, from about 900 MPa to about 1350 MPa, from about 900 MPa to about 1340 MPa, from about 900 MPa to about 1320 MPa, from about 900 MPa to about 1300 MPa, from about 900 MPa to about 1280 MPa, from about 900 MPa to about 1260 MPa, from about 900 MPa to about 1250 MPa, from about 900 MPa to about 1240 MPa, from about 900 MPa to about 1220 MPa, from about 900 MPa to about 1210 MPa, from about 900 MPa to about 1200 MPa, from about 900 MPa to about 1180 MPa, from about 900 MPa to about 1160 MPa, from about 900 MPa to about 1150 MPa, from about 900 MPa to about 1140 MPa, from about 900 MPa to about 1120 MPa, from about 900 MPa to about 1100 MPa, from about 900 MPa to about 1080 MPa, from about 900 MPa to about 1060 MPa, from about 900 MPa to about 1050 MPa, or from about 950 MPa to about 1050 MPa, or from about 1000 MPa to about 1050 MPa. CSmax may be measured at a major surface or may be found at a depth from the major surface within the CS region.

In one or more embodiments, the glass article has a stress profile with a CS magnitude of about 750 MPa or greater or about 800 MPa or greater at a depth within the glass article of about 5 micrometers from the first major surface 102 ($CS_5$). In one or more embodiments, the $CS_5$ is about 760 MPa or greater, 775 MPa or greater, 810 MPa or greater, about 820 MPa or greater, about 830 MPa or greater, about 840 MPa or greater, about 850 MPa or greater, about 860 MPa or greater, about 870 MPa or greater, about 880 MPa or greater, about 890 MPa or greater, or about 900 MPa or greater. In one or more embodiments, the CS io is in a range from about 800 MPa to about 1000 MPa, from about 825 MPa to about 1000 MPa, from about 850 MPa to about 1000 MPa, from about 875 MPa to about 1000 MPa, from about 900 MPa to about 1000 MPa, from about 925 MPa to about 1000 MPa, from about 950 MPa to about 1000 MPa, from about 800 MPa to about 975 MPa, from about 800 MPa to about 950 MPa, from about 800 MPa to about 925 MPa, from about 800 MPa to about 900 MPa, from about 800 MPa to about 875 MPa, or from about 800 MPa to about 850 MPa.

In one or more embodiments, the glass article has a stress profile with a CS magnitude of 800 MPa or greater at a depth within the glass article of about 10 micrometers from the first major surface 102 ($CS_{10}$). In one or more embodiments, the $CS_{10}$ is about 810 MPa or greater, about 820 MPa or greater, about 830 MPa or greater, about 840 MPa or greater, about 850 MPa or greater, about 860 MPa or greater, about 870 MPa or greater, about 880 MPa or greater, about 890 MPa or greater, or about 900 MPa or greater. In one or more embodiments, the $CS_{10}$ is in a range from about 800 MPa to about 1000 MPa, from about 825 MPa to about 1000 MPa, from about 850 MPa to about 1000 MPa, from about 875 MPa to about 1000 MPa, from about 900 MPa to about 1000 MPa, from about 925 MPa to about 1000 MPa, from about 950 MPa to about 1000 MPa, from about 800 MPa to about 975 MPa, from about 800 MPa to about 950 MPa, from about 800 MPa to about 925 MPa, from about 800 MPa to about 900 MPa, from about 800 MPa to about 875 MPa, or from about 800 MPa to about 850 MPa.

In one or more embodiments, the glass article has a stress profile with a CS magnitude of 800 MPa or greater at a depth of about greater than 30 micrometers from the first major surface ($CS_{>30}$). In one or more embodiments, the $CS_{>}30$ is about 850 MPa or greater, about 900 MPa or greater, about 950 MPa or greater, about 1 GPa or greater, about 1.05 GPa or greater, about 1.1 GPa or greater, or about 1.2 GPa or greater. In one or more embodiments, the $CS_{>30}$ is in a range from about 800 MPa to about 1200 MPa, from about 825 MPa to about 1200 MPa, from about 850 MPa to about 1200 MPa, from about 875 MPa to about 1200 MPa, from about 900 MPa to about 1200 MPa, from about 925 MPa to about 1200 MPa, from about 950 MPa to about 1200 MPa, from about 800 MPa to about 1175 MPa, from about 800 MPa to about 1150 MPa, from about 800 MPa to about 1125 MPa, from about 800 MPa to about 1100 MPa, from about 800 MPa to about 1075 MPa, from about 800 MPa to about 1050 MPa, or from about 800 MPa to about 1000 MPa.

In one or more embodiments, the glass article has a stress profile with a $CT_{max}$ that is present or located at a depth within the glass article from the first major surface in a range from about 0.25 t to about 0.75 t. In one or more embodiments, $CT_{max}$ is present or located at a depth in a range from about 0.25 t to about 0.74 t, from about 0.25 t to about 0.72 t, from about 0.25 t to about 0.70 t, from about 0.25 t to about 0.68 t, from about 0.25 t to about 0.66 t, from about 0.25 t to about 0.65 t, from about 0.25 t to about 0.62 t, from about 0.25 t to about 0.60 t, from about 0.25 t to about 0.58 t, from about 0.25 t to about 0.56 t, from about 0.25 t to about 0.55 t, from about 0.25 t to about 0.54 t, from about 0.25 t to about 0.52 t, from about 0.25 t to about 0.50 t, from about 0.26 t to about 0.75 t, from about 0.28 t to about 0.75 t, from about 0.30 t to about 0.75 t, from about 0.32 t to about 0.75 t, from about 0.34 t to about 0.75 t, from about 0.35 t to about 0.75 t, from about 0.36 t to about 0.75 t, from about 0.38 t to about 0.75 t, from about 0.40 t to about 0.75 t, from about 0.42 t to about 0.75 t, from about 0.44 t to about 0.75 t, from about 0.45 t to about 0.75 t, from about 0.46 t to about 0.75 t, from about 0.48 t to about 0.50 t, from about 0.30 t to about 0.70 t, from about 0.35 t to about 0.65 t, from about 0.4 t to about 0.6 t, or from about 0.45 t to about 0.55 t. In one or more embodiments, the foregoing ranges for the location of $CT_{max}$ is present when the glass article is in a substantially flat configuration (e.g., the glass article has a radius of curvature of greater than about 5000 mm, or greater than about 10,000 mm).

In one or more embodiments, the $CT_{max}$ magnitude is about 80 MPa or less, about 78 MPa or less, about 76 MPa or less, about 75 MPa or less, about 74 MPa or less, about 72 MPa or less, about 70 MPa or less, about 68 MPa or less, about 66 MPa or less, about 65 MPa or less, about 64 MPa or less, about 62 MPa or less, about 60 MPa or less, about 58 MPa or less, about 56 MPa or less, about 55 MPa or less, about 54 MPa or less, about 52 MPa or less, or about 50 MPa or less. In one or more embodiments, the $CT_{max}$ magnitude is in a range from about 40 MPa to about 80 MPa, from about 45 MPa to about 80 MPa, from about 50 MPa to about 80 MPa, from about 55 MPa to about 80 MPa, from about 60 MPa to about 80 MPa, from about 65 MPa to about 80 MPa, from about 70 MPa to about 80 MPa, from about 40 MPa to about 75 MPa, from about 40 MPa to about 70 MPa, from about 40 MPa to about 65 MPa, from about 40 MPa to about 60 MPa, from about 40 MPa to about 55 MPa, or from about 40 MPa to about 50 MPa. In one or more embodiments, the foregoing ranges the magnitude of $CT_{max}$ is present when the glass article is in a substantially flat configuration (e.g., the glass article has a radius of curvature of greater than about 5000 mm, or greater than about 10,000 mm).

In one or more embodiments, a portion of the stress profile has a parabolic-like shape. In some embodiments, the stress profile is free of a flat stress (i.e., compressive or tensile) portion or a portion that exhibits a substantially constant stress (i.e., compressive or tensile). In some embodiments, the CT region exhibits a stress profile that is substantially free of a flat stress or free of a substantially constant stress. In one or more embodiments, the stress profile is substantially free of any linear segments that extend in a depth direction or along at least a portion of the thickness t of the glass article. In other words, the stress profile is substantially continuously increasing or decreasing along the thickness t. In some embodiments, the stress profile is substantially free of any linear segments in a depth direction having a length of about 10 micrometers or more, about 50 micrometers or more, or about 100 micrometers or more, or about 200 micrometers or more. As used herein, the term "linear" refers to a slope having a magnitude of less than about 5 MPa/micrometer, or less than about 2 MPa/micrometer along the linear segment. In some embodiments, one or more portions of the stress profile that are substantially free of any linear segments in a depth direction are present at depths within the glass article of about 5 micrometers or greater (e.g., 10 micrometers or greater, or 15 micrometers or greater) from either one or both the first surface or the second surface. For example, along a depth of about 0 micrometers to less than about 5 micrometers from the first surface, the stress profile may include linear segments, but from a depth of about 5 micrometers or greater from the first surface, the stress profile may be substantially free of linear segments.

In one or more embodiments, all points of the CT region within 0.1 t, 0.15 t, 0.2 t, or 0.25 t from the depth of $CT_{max}$ comprise a tangent having a non-zero slope. In one or more embodiments, all such points comprise a tangent having a slope that is greater than about 0.5 MPa/micrometer in magnitude, greater than about 0.75 MPa/micrometer in magnitude, greater than about 1 MPa/micrometer in magnitude, greater than about 1.5 MPa/micrometer in magnitude, or greater about 2 MPa/micrometer in magnitude than, or greater than about 0.5 MPa/micrometer in magnitude.

In one or more embodiments, all points of the stress profile at a depth from about 0.12 t or greater (e.g., from about 0.12 t to about 0.24 t, from about 0.14 t to about 0.24 t, from about 0.15 t to about 0.24 t, from about 0.16 t to about 0.24 t, from about 0.18 t to about 0.24 t, from about 0.12 t to about 0.22 t, from about 0.12 t to about 0.2 t, from about 0.12 t to about 0.18 t, from about 0.12 t to about 0.16 t, from about 0.12 t to about 0.15 t, from about 0.12 t to about 0.14 t, or from about 0.15 t to about 0.2 t) comprise a tangent having a non-zero slope.

In one or more embodiments, the glass article may be described in terms of the shape of the stress profile along at least a portion of the CT region (112 in FIG. 3). For example, in some embodiments, the stress profile along a substantial portion or the entire CT region may be approximated by equation. In some embodiments, the stress profile along the CT region may be approximated by equation (3):

$$\text{Stress}(x)=\text{CTmax}-(((\text{CTmax}\cdot(n+1))/0.5^n)\cdot|(x/t)-0.51|^n) \qquad (3)$$

In equation (3), the stress (x) is the stress value at position x. Here the stress is positive (tension). $CT_{max}$ is the maximum central tension as a positive value in MPa. The value x is position along the thickness (t) in micrometers, with a range from 0 to t; x=0 is one surface (102, in FIG. 3), x=0.5 t is the center of the glass article, stress(x)=CTmax, and x=t is the opposite surface (104, in FIG. 3). $CT_{max}$ used in equation (3) may be in the range from about 40 MPa to about 80 MPa, and n is a fitting parameter from 1.5 to 5 (e.g., 2 to 4, 2 to 3 or 1.8 to 2.2) whereby n=2 can provide a parabolic stress profile, exponents that deviate from n=2 provide stress profiles with near parabolic stress profiles.

In one or more embodiments, the DOC of the glass article is about 0.2 t or less. For example, DOC may be about 0.18 t or less, about 0.18 t or less, about 0.16 t or less, about 0.15 t or less, about 0.14 t or less, about 0.12 t or less, about 0.1 t or less, about 0.08 t or less, about 0.06 t or less, about 0.05 t or less, about 0.04 t or less, or about 0.03 t or less. In one or more embodiments, DOC is in a range from about 0.02 t to about 0.2 t, from about 0.04 t to about 0.2 t, from about 0.05 t to about 0.2 t, from about 0.06 t to about 0.2 t, from about 0.08 t to about 0.2 t, from about 0.1 t to about 0.2 t, from about 0.12 t to about 0.2 t, from about 0.14 t to about 0.2 t, from about 0.15 t to about 0.2 t, from about 0.16 t to about 0.2 t, from about 0.02 t to about 0.18 t, from about 0.02 t to about 0.16 t, from about 0.02 t to about 0.15 t, from about 0.02 t to about 0.14 t, from about 0.02 t to about 0.12 t, from about 0.02 t to about 0.1 t, from about 0.02 t to about 0.08, from about 0.02 t to about 0.06 t, from about 0.02 t to about 0.05 t, from about 0.1 t to about 0.8 t, from about 0.12 t to about 0.16 t, or from about 0.14 t to about 0.17 t.

Figure 4:
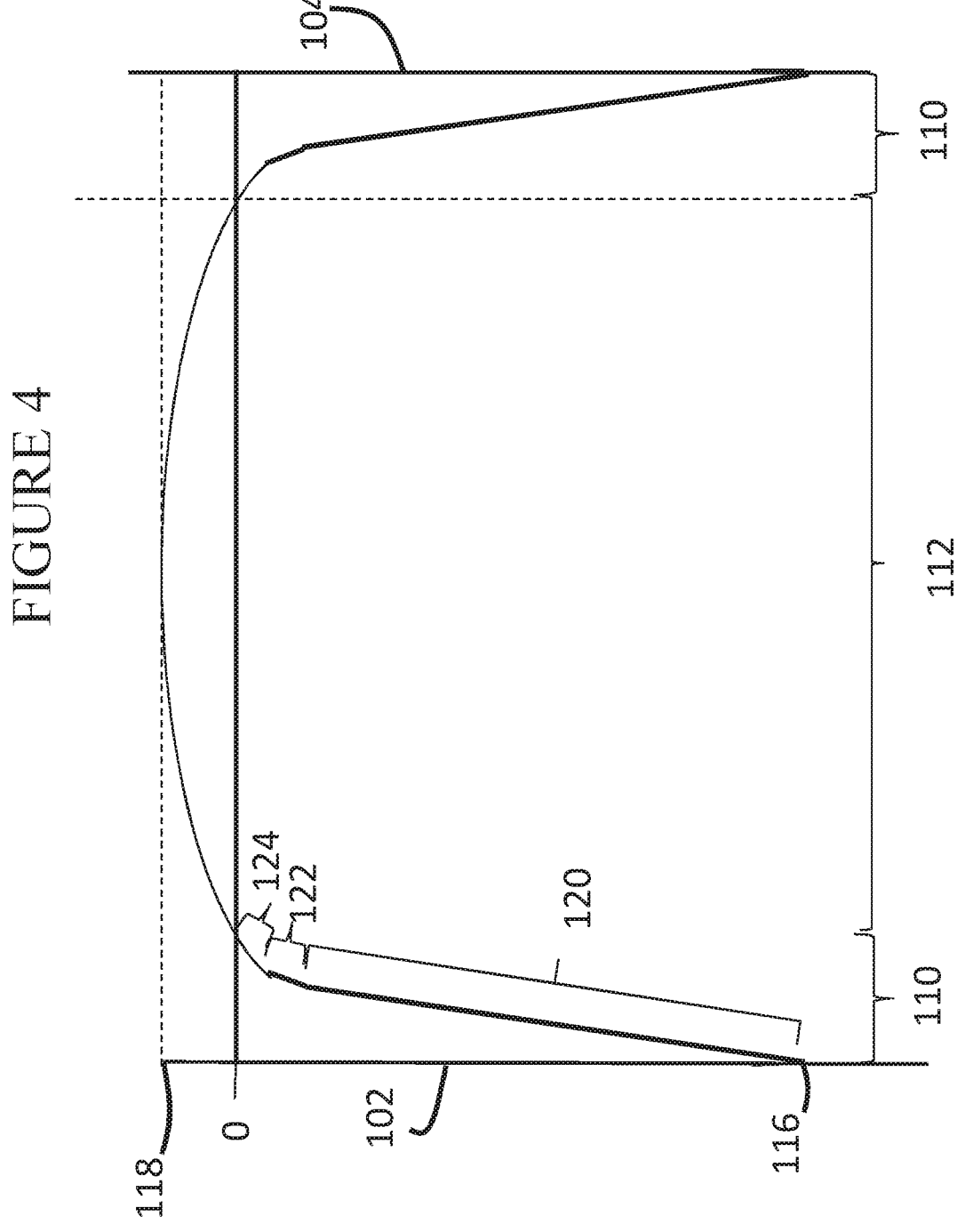
FIG. 4 is an exemplary stress profile of the glass article shown in FIG. 2.

In one or more embodiments, the glass article has a DOL that is in a range from about 10 micrometers to about 50 micrometers, from about 12 micrometers to about 50 micrometers, from about 14 micrometers to about 50 micrometers, from about 15 micrometers to about 50 micrometers, from about 16 micrometers to about 50 micrometers, from about 18 micrometers to about 50 micrometers, from about 20 micrometers to about 50 micrometers, from about 22 micrometers to about 50 micrometers, from about 24 micrometers to about 50 micrometers, from about 25 micrometers to about 50 micrometers, from about 26 micrometers to about 50 micrometers, from about 28 micrometers to about 50 micrometers, from about 30 micrometers to about 50 micrometers, from about 10 micrometers to about 48 micrometers, from about 10 micrometers to about 46 micrometers, from about 10 micrometers to about 45 micrometers, from about 10 micrometers to about 44 micrometers, from about 10 micrometers to about 42 micrometers, from about 10 micrometers to about 40 micrometers, from about 10 micrometers to about 38 micrometers, from about 10 micrometers to about 36 micrometers, from about 10 micrometers to about 35 micrometers, from about 10 micrometers to about 34 micrometers, from about 10 micrometers to about 32 micrometers, from about 10 micrometers to about 30 micrometers, from about 10 micrometers to about 28 micrometers, from about 10 micrometers to about 26 micrometers, from about 10 micrometers to about 25 micrometers, from about 20 micrometers to about 40 micrometers, from about 25 micrometers to about 40 micrometers, from about 20 micrometers to about 35 micrometers, or from about 25 micrometers to about 35 micrometers. In one or more embodiments, at least a portion of the stress profile comprises a spike region 120 extending from the first major surface, a tail region 124 and a knee region 122 between the spike region and the tail region, as illustrated in FIG. 4. The spike region 120 is within the CS region of the stress profile. In one or more embodiments, wherein all points of the stress profile in the spike region comprise a tangent having a slope in magnitude that is in a range from about 15 MPa/micrometer to about 200 MPa/micrometer, from about 20 MPa/micrometer to about 200 MPa/micrometer, from about 25 MPa/micrometer to about 200 MPa/micrometer, from about 30 MPa/micrometer to about 200 MPa/micrometer to about 35 MPa/micrometer to about 200 MPa/micrometer, from about 40 MPa/micrometer to about 200 MPa/micrometer, from about 45 MPa/micrometer to about 200 MPa/micrometer, from about 100 MPa/micrometer to about 200 MPa/micrometer, from about 150 MPa/micrometer to about 200 MPa/micrometer, from about 15 MPa/micrometer to about 190 MPa/micrometer, from about 15 MPa/micrometer to about 180 MPa/micrometer, from about 15 MPa/micrometer to about 170 MPa/micrometer, from about 15 MPa/micrometer to about 160 MPa/micrometer, from about 15 MPa/micrometer to about 150 MPa/micrometer, from about 15 MPa/micrometer to about 140 MPa/micrometer, from about 15 MPa/micrometer to about 130 MPa/micrometer, from about 15 MPa/micrometer to about 120 MPa/micrometer, from about 15 MPa/micrometer to about 100 MPa/micrometer, from about 15 MPa/micrometer to about 750 MPa/micrometer, from about 15 MPa/micrometer to about 50 MPa/micrometer, from about 50 MPa/micrometer to about 150 MPa/micrometer, or from about 75 MPa/micrometer to about 125 MPa/micrometer.

In one or more embodiments, and all points in the tail region comprise a tangent having a slope in magnitude that is in a range from about 0.01 MPa/micrometer to about 3 MPa/micrometer, from about 0.05 MPa/micrometer to about 3 MPa/micrometer, from about 0.1 MPa/micrometer to about 3 MPa/micrometer, from about 0.25 MPa/micrometer to about 3 MPa/micrometer, from about 0.5 MPa/micrometer to about 3 MPa/micrometer, from about 0.75 MPa/micrometer to about 3 MPa/micrometer, from about 1 MPa/micrometer to about 3 MPa/micrometer, from about 1.25 MPa/micrometer to about 3 MPa/micrometer, from about 1.5 MPa/micrometer to about 3 MPa/micrometer, from about 1.75 MPa/micrometer to about 3 MPa/micrometer, from about 2 MPa/micrometer to about 3 MPa/micrometer, from about 0.01 MPa/micrometer to about 2.9 MPa/micrometer, from about 0.01 MPa/micrometer to about 2.8 MPa/micrometer, from about 0.01 MPa/micrometer to about 2.75 MPa/micrometer, from about 0.01 MPa/micrometer to about 2.7 MPa/micrometer, from about 0.01 MPa/micrometer to about 2.6 MPa/micrometer, from about 0.01 MPa/micrometer to about 2.5 MPa/micrometer, from about 0.01 MPa/micrometer to about 2.4 MPa/micrometer, from about 0.01 MPa/micrometer to about 2.2 MPa/micrometer, from about 0.01 MPa/micrometer to about 2.1 MPa/micrometer, from about 0.01 MPa/micrometer to about 2 MPa/micrometer, from about 0.01 MPa/micrometer to about 1.75 MPa/micrometer, from about 0.01 MPa/micrometer to about 1.5 MPa/micrometer, from about 0.01 MPa/micrometer to about 1.25 MPa/micrometer, from about 0.01 MPa/micrometer to about 1 MPa/micrometer, from about 0.01 MPa/micrometer to about 0.75 MPa/micrometer, from about 0.01 MPa/micrometer to about 0.5 MPa/micrometer, from about 0.01 MPa/micrometer to about 0.25 MPa/micrometer, from about 0.1 MPa/micrometer to about 2 MPa/micrometer, from about 0.5 MPa/micrometer to about 2 MPa/micrometer, or from about 1 MPa/micrometer to about 3 MPa/micrometer.

In one or more embodiments, the CS magnitude within the spike region is in a range from about greater than 200 MPa to about 1500 MPa. For example, the CS magnitude in the spike region may be in a range from about 250 MPa to about 1500 MPa, from about 300 MPa to about 1500 MPa, from about 350 MPa to about 1500 MPa, from about 400 MPa to about 1500 MPa, from about 450 MPa to about 1500 MPa, from about 500 MPa to about 1500 MPa, from about 550 MPa to about 1500 MPa, from about 600 MPa to about 1500 MPa, from about 750 MPa to about 1500 MPa, from about 800 MPa to about 1500 MPa, from about 850 MPa to about 1500 MPa, from about 900 MPa to about 1500 MPa, from about 950 MPa to about 1500 MPa, from about 1000 MPa to about 1500 MPa, from about 1050 MPa to about 1500 MPa, from about 1100 MPa to about 1500 MPa, from about 1200 MPa to about 1500 MPa, from about 250 MPa to about 1450 MPa, from about 250 MPa to about 1400

MPa, from about 250 MPa to about 1350 MPa, from about 250 MPa to about 1300 MPa, from about 250 MPa to about 1250 MPa, from about 250 MPa to about 1200 MPa, from about 250 MPa to about 1150 MPa, from about 250 MPa to about 1100 MPa, from about 250 MPa to about 1050 MPa, from about 250 MPa to about 1000 MPa, from about 250 MPa to about 950 MPa, from about 250 MPa to about 90 MPa, from about 250 MPa to about 850 MPa, from about 250 MPa to about 800 MPa, from about 250 MPa to about 750 MPa, from about 250 MPa to about 700 MPa, from about 250 MPa to about 650 MPa, from about 250 MPa to about 600 MPa, from about 250 MPa to about 550 MPa, from about 250 MPa to about 500 MPa, from about 800 MPa to about 1400 MPa, from about 900 MPa to about 1300 MPa, from about 900 MPa to about 1200 MPa, from about 900 MPa to about 1100 MPa, or from about 900 MPa to about 1050 MPa.

In one or more embodiments, the CS magnitude in the knee region is in a range from about 5 MPa to about 200 MPa, from about 10 MPa to about 200 MPa, from about 15 MPa to about 200 MPa, from about 20 MPa to about 200 MPa, from about 25 MPa to about 200 MPa, from about 30 MPa to about 200 MPa, from about 35 MPa to about 200 MPa, from about 40 MPa to about 200 MPa, from about 45 MPa to about 200 MPa, from about 50 MPa to about 200 MPa, from about 55 MPa to about 200 MPa, from about 60 MPa to about 200 MPa, from about 65 MPa to about 200 MPa, from about 75 MPa to about 200 MPa, from about 80 MPa to about 200 MPa, from about 90 MPa to about 200 MPa, from about 100 MPa to about 200 MPa, from about 125 MPa to about 200 MPa, from about 150 MPa to about 200 MPa, from about 5 MPa to about 190 MPa, from about 5 MPa to about 180 MPa, from about 5 MPa to about 175 MPa, from about 5 MPa to about 170 MPa, from about 5 MPa to about 160 MPa, from about 5 MPa to about 150 MPa, from about 5 MPa to about 140 MPa, from about 5 MPa to about 130 MPa, from about 5 MPa to about 125 MPa, from about 5 MPa to about 120 MPa, from about 5 MPa to about 110 MPa, from about 5 MPa to about 100 MPa, from about 5 MPa to about 75 MPa, from about 5 MPa to about 50 MPa, from about 5 MPa to about 25 MPa, or from about 10 MPa to about 100 MPa.

In one or more embodiments, the knee region of the stress profile extends from about 10 micrometers to about 50 micrometers from the first major surface. For example, the knee region of the stress profile extends from about 12 micrometers to about 50 micrometers, from about 14 micrometers to about 50 micrometers, from about 15 micrometers to about 50 micrometers, from about 16 micrometers to about 50 micrometers, from about 18 micrometers to about 50 micrometers, from about 20 micrometers to about 50 micrometers, from about 22 micrometers to about 50 micrometers, from about 24 micrometers to about 50 micrometers, from about 25 micrometers to about 50 micrometers, from about 26 micrometers to about 50 micrometers, from about 28 micrometers to about 50 micrometers, from about 30 micrometers to about 50 micrometers, from about 32 micrometers to about 50 micrometers, from about 34 micrometers to about 50 micrometers, from about 35 micrometers to about 50 micrometers, from about 36 micrometers to about 50 micrometers, from about 38 micrometers to about 50 micrometers, from about 40 micrometers to about 50 micrometers, from about 10 micrometers to about 48 micrometers, from about 10 micrometers to about 46 micrometers, from about 10 micrometers to about 45 micrometers, from about 10 micrometers to about 44 micrometers, from about 10 micrometers to about 42 micrometers, from about 10 micrometers to about 40 micrometers, from about 10 micrometers to about 38 micrometers, from about 10 micrometers to about 36 micrometers, from about 10 micrometers to about 35 micrometers, from about 10 micrometers to about 34 micrometers, from about 10 micrometers to about 32 micrometers, from about 10 micrometers to about 30 micrometers, from about 10 micrometers to about 28 micrometers, from about 10 micrometers to about 26 micrometers, from about 10 micrometers to about 25 micrometers, from about 10 micrometers to about 24 micrometers, from about 10 micrometers to about 22 micrometers, or from about 10 micrometers to about 20 micrometers, from the first major surface.

In one or more embodiments, the tail region extends from about the knee region to the depth of $CT_{max}$. In one or more embodiments, the tail region comprises one or both of a compressive stress tail region, and a tensile stress tail region. In one or more specific embodiments, the tail region comprises a compressive stress tail region and a tensile stress tail region, meaning the tail cross from compressive to tensile stress and DOC is positioned within the tail region.

In one or more embodiments, the glass article comprises one or more of a frame, a display or touch panel disposed on the first or second major surface. In one or more embodiments, the display may be a liquid crystal display, an organic light-emitting diode (OLED) display, a transmissive display or other display. In one or embodiments, the glass article includes an adhesive or adhesive layer disposed between the first or second major surface and the frame, display or touch panel.

In one or more embodiments, the display module includes touch functionality and such functionality is accessible through the glass article 100. In one or more embodiments, displayed images or content shown by the display module is visible through the glass article.

In one or more embodiments, the thickness of the glass article is in a range from about 0.05 mm to about 2 mm. For example, the thickness may be in a range from about 0.06 mm to about 2 mm, from about 0.08 mm to about 2 mm, from about 0.1 mm to about 2 mm, from about 0.12 mm to about 2 mm, from about 0.05 mm to about 2 mm, from about 0.14 mm to about 2 mm, from about 0.15 mm to about 2 mm, from about 0.16 mm to about 2 mm, from about 0.18 mm to about 2 mm, from about 0.2 mm to about 2 mm, from about 0.25 mm to about 2 mm, from about 0.3 mm to about 2 mm, from about 0.4 mm to about 2 mm, from about 0.5 mm to about 2 mm, from about 0.55 mm to about 2 mm, from about 0.6 mm to about 2 mm, from about 0.05 mm to about 2 mm, from about 0.6 mm to about 2 mm, from about 0.7 mm to about 2 mm, from about 0.8 mm to about 2 mm, from about 0.9 mm to about 2 mm, from about 1 mm to about 2 mm, from about 1.1 mm to about 2 mm, from about 1.2 mm to about 2 mm, from about 1.5 mm to about 2 mm, from about 0.05 mm to about 1.8 mm, from about 0.05 mm to about 1.6 mm, from about 0.05 mm to about 1.5 mm, from about 0.05 mm to about 1.4 mm, from about 0.05 mm to about 1.2 mm, from about 0.05 mm to about 1.1 mm, from about 0.05 mm to about 1 mm, from about 0.05 mm to about 0.9 mm, from about 0.05 mm to about 0.8 mm, from about 0.05 mm to about 0.7 mm, from about 0.05 mm to about 0.6 mm, from about 0.05 mm to about 0.55 mm, from about 0.05 mm to about 0.5 mm, from about 0.05 mm to about 0.4 mm, from about 0.05 mm to about 0.3 mm, or from about 0.7 mm to about 1.5 mm.

In one or more embodiments, the glass substrate has a width (W) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, the glass substrate has a length (L) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

The glass article of any one of the preceding claims, wherein either one of or both the first major surface 102 and the second major surface 104 comprises a surface treatment. The surface treatment may cover at least a portion of the first major surface 102 and/or the second major surface 104. Exemplary surface treatments include an easy-to-clean surface, an anti-glare surface, an anti-reflective surface, a haptic surface, and a decorative surface. In one or more embodiments, the at least a portion of the first major surface and 102/or the second major surface 104 may include any one, any two or all three of an anti-glare surface, an anti-reflective surface, a haptic surface, and a decorative surface. For example, first major surface 102 may include an anti-glare surface and the second major surface 104 may include an anti-reflective surface. In another example, the first major surface 102 includes an anti-reflective surface and the second major surface 104 includes an anti-glare surface. In yet another example, the first major surface 102 comprises either one of or both the anti-glare surface and the anti-reflective surface, and the second major surface 104 includes the decorative surface.

The anti-reflective surface may be formed using an etching process and may exhibit a transmission haze 20% or less (e.g., about 15% or less, or about 10% or less), and a distinctiveness of image (DOI) of about 80 or less. As used herein, the terms "transmission haze" and "haze" refer to the percentage of transmitted light scattered outside an angular cone of about ±2.5° in accordance with ASTM procedure D1003. For an optically smooth surface, transmission haze is generally near zero. As used herein, the term "distinctness of image" is defined by method A of ASTM procedure D5767 (ASTM 5767), entitled "Standard Test Methods for Instrumental Measurements of Distinctness-of-Image Gloss of Coating Surfaces," the contents of which are incorporated herein by reference in their entirety. In accordance with method A of ASTM 5767, substrate reflectance factor measurements are made on the anti-glare surface at the specular viewing angle and at an angle slightly off the specular viewing angle. The values obtained from these measurements are combined to provide a DOI value. In particular, DOI is calculated according to the equation (4):

$$DOI = \left[1 - \frac{Ros}{Rs}\right] \times 100 \qquad \text{Equation (4)}$$

where Ros is the relative reflection intensity average between 0.2° and 0.4 away from the specular reflection direction, and Rs is the relative reflection intensity average in the specular direction (between +0.05° and −0.05°, centered around the specular reflection direction). If the input light source angle is +20° from the sample surface normal (as it is throughout this disclosure), and the surface normal to the sample is taken as 0°, then the measurement of specular reflected light Rs is taken as an average in the range of about −19.95° to −20.05°, and Ros is taken as the average reflected intensity in the range of about −20.2° to −20.4° (or from −19.6° to −19.8°, or an average of both of these two ranges). As used herein, DOI values should be directly interpreted as specifying a target ratio of Ros/Rs as defined herein. In some embodiments, the anti-glare surface has a reflected scattering profile such that >95% of the reflected optical power is contained within a cone of +/−10°, where the cone is centered around the specular reflection direction for any input angle.

The resulting the anti-glare surface may include a textured surface with plurality of concave features having an opening facing outwardly from the surface. The opening may have an average cross-sectional dimension of about 30 micrometers or less. In one or more embodiments, the anti-glare surface exhibits low sparkle (in terms of low pixel power deviation reference or PPDr) such as PPDr of about 6% or less, as used herein, the terms "pixel power deviation referenced" and "PPDr" refer to the quantitative measurement for display sparkle. Unless otherwise specified, PPDr is measured using a display arrangement that includes an edge-lit liquid crystal display screen (twisted nematic liquid crystal display) having a native sub-pixel pitch of 60 μm×180 μm and a sub-pixel opening window size of about 44 μm×about 142 μm. The front surface of the liquid crystal display screen had a glossy, anti-reflection type linear polarizer film. To determine PPDr of a display system or an anti-glare surface that forms a portion of a display system, a screen is placed in the focal region of an "eye-simulator" camera, which approximates the parameters of the eye of a human observer. As such, the camera system includes an aperture (or "pupil aperture") that is inserted into the optical path to adjust the collection angle of light, and thus approximate the aperture of the pupil of the human eye. In the PPDr measurements described herein, the iris diaphragm subtends an angle of 18 milliradians.

The anti-reflective surface may be formed by a multi-layer coating stack formed from alternating layers of a high refractive index material and a low refractive index material. Such coatings stacks may include 6 layers or more. In one or more embodiment, the anti-reflective surface may exhibit a single-side average light reflectance of about 2% or less (e.g., about 1.5% or less, about 1% or less, about 0.75% or less, about 0.5% or less, or about 0.25% or less) over the optical wavelength regime in the range from about 400 nm to about 800 nm. The average reflectance is measured at an incident illumination angle greater than about 0 degrees to less than about 10 degrees.

The decorative surface may include any aesthetic design formed from a pigment (e.g., ink, paint and the like) and can include a wood-grain design, a brushed metal design, a graphic design, a portrait, or a logo. In one or more embodiments, the decorative surface exhibits a deadfront effect in which the decorative surface disguises or masks the underlying display from a viewer when the display is turned off but permits the display to be viewed when the display is turned on. The decorative surface may be printed onto the glass article. In one or more embodiments, the anti-glare surface includes an etched surface. In one or more embodiments, the anti-reflective surface includes a multi-layer coating. In one or more embodiments, the easy-to-clean surface includes an oleophobic coating that imparts anti-fingerprint properties. In one or more embodiments, the haptic surface includes a raised or recessed surface formed from depositing a polymer or glass material on the surface to provide a user with tactile feedback when touched.

In one or more embodiments, one or both of the first major surface and the second major surface comprise a periphery surrounding an interior portion. In one or more embodiments, the periphery comprises a surface treatment, while the interior portion is substantially free of any surface treatment or comprises a different surface treatment than the periphery. In one or more embodiments, a decorative surface is disposed on at least a portion of the periphery and the interior portion is substantially free of the decorative surface. Decorative surfaces may include any one of a black boarder, wood-grain design, a brushed metal design, a graphic design, a portrait, and a logo.

In one or more embodiments, the glass article is substantially free of an anti-splinter layer (which may be a film or coating). In such embodiments, one of the first or second major surface is substantially free of any anti-splinter layers.

In one or more embodiments, when the glass article is curved from a substantially flat configuration to a curved configuration such that the first major surface comprises a concave shape having a radius of curvature of about 250 mm, the $CS_{max}$ increases by more than about 8%, more than about 10%, more than about 12%, more than about 14%, more than about 15%, more than about 16%, more than about 18% or more than about 20%.

In more than one embodiments, when the glass article is curved from a substantially flat configuration to a curved configuration such that the first major surface comprises a concave shape having a radius of curvature of about 500 mm, the DOC increases by about 200% or more, or about 300% or more, and a second depth of compression ($DOC_2$) measured from the second major surface decreases by less than 15%. In one or more embodiments, DOC increases by about 210% or more, about 220% or more, about 230% or more, 240% or more, 250% or more, 260% or more, 270% or more, 280% or more, 290% or more, about 300% or more, about 310% or more, about 320% or more, about 325% or more, about 330% or more, about 340% or more, about 350% or more, about 360% or more, about 370% or more, about 380% or more, about 310% or more, about 390% or more, or about 400%. For example, DOC, increases by an amount in a range from about 200% to about 500%, from about 225% to about 500%, from about 250% to about 500%, from about 275% to about 500%, from about 300% to about 500%, from about 325% to about 500%, from about 350% to about 500%, from about 375% to about 500%, from about 400% to about 500%, from about 425% to about 500%, from about 450% to about 500%, from about 200% to about 475%, from about 200% to about 450%, from about 200% to about 425%, from about 200% to about 400%, from about 200% to about 375%, from about 200% to about 350%, from about 200% to about 325%, from about 200% to about 300%, from about 200% to about 275%, from about 200% to about 250%, or from about 200% to about 225%. In one or more such embodiments, when the glass article is curved to from a substantially flat configuration to a curved configuration such that the first major surface comprises a concave shape having a radius of curvature of about 500 mm, the $CT_{max}$ increases by 250% or less (e.g., 225% or less, 200% or less, 175% or less, 150% or less, 125% or less, 100% or less, 75% or less, 50% or less, or 25% or less).

In one or more embodiments, when the glass article is curved to from a substantially flat configuration to a curved configuration such that the first major surface comprises a concave shape having a radius of curvature of about 250 mm, the DOC increases by more than about 600%, and a second depth of compression ($DOC_2$) measured from the second major surface decreases by about less than 25%. For example, DOC may increase by about 625% or more, about 650% or more or about 700% or more. $DOC_2$ may decrease by about 20% or less, about 15% or less, or about 10% or less. In one or more such embodiments, when the glass article is curved to from a substantially flat configuration to a curved configuration such that the first major surface comprises a concave shape having a radius of curvature of about 250 mm, the $CT_{max}$ increases by 400% or less (e.g., 375% or less, 350% or less, 325% or less, 300% or less, 275% or less, 250% or less, 225% or less, 200% or less, 175% or less, 150% or less, 125% or less, 100% or less, 75% or less, 50% or less, or 25% or less).

A third aspect of this disclosure pertains to a curved glass article 200 as shown in FIG. 5. The curved glass article 200 may have a glass composition as described in accordance with one or more embodiments of the first aspect. In one or more embodiments, the curved glass article comprises a first major concave surface 210, a second major convex surface 220 opposing the first major concave surface, a minor surface 230 connecting the first major concave surface and the second major convex surface defining a thickness (t) (millimeters). In one or more embodiments, the curved glass article comprises a first CS region extending from the first major concave surface to a first depth of compressive stress ($DOC_1$). The first CS region has first maximum CS value ($CS_{max1}$). In one or more embodiments, the second major convex surface comprises a second CS region extending from the second major convex surface to a second depth of compressive stress ($DOC_2$), the second CS region having a second maximum CS value (CSmax2). The curved glass article includes a central tension (CT) region disposed between the first CS region and the second CS region having a maximum CT value ($CT_{curved-max}$). The CS region and the CT region define a stress profile along the thickness.

In one or more embodiments, the thickness of the curved glass article is in a range from about 0.05 mm to about 2 mm. For example, the thickness may be in a range from about 0.06 mm to about 2 mm, from about 0.08 mm to about 2 mm, from about 0.1 mm to about 2 mm, from about 0.12 mm to about 2 mm, from about 0.05 mm to about 2 mm, from about 0.14 mm to about 2 mm, from about 0.15 mm to about 2 mm, from about 0.16 mm to about 2 mm, from about 0.18 mm to about 2 mm, from about 0.2 mm to about 2 mm, from about 0.25 mm to about 2 mm, from about 0.3 mm to about 2 mm, from about 0.4 mm to about 2 mm, from about 0.5 mm to about 2 mm, from about 0.55 mm to about 2 mm, from about 0.6 mm to about 2 mm, from about 0.05 mm to about 2 mm, from about 0.6 mm to about 2 mm, from about 0.7 mm to about 2 mm, from about 0.8 mm to about 2 mm, from about 0.9 mm to about 2 mm, from about 1 mm to about 2 mm, from about 1.1 mm to about 2 mm, from about 1.2 mm to about 2 mm, from about 1.5 mm to about 2 mm, from about 0.05 mm to about 1.8 mm, from about 0.05 mm to about 1.6 mm, from about 0.05 mm to about 1.5 mm, from about 0.05 mm to about 1.4 mm, from about 0.05 mm to about 1.2 mm, from about 0.05 mm to about 1.1 mm, from about 0.05 mm to about 1 mm, from about 0.05 mm to about 0.9 mm, from about 0.05 mm to about 0.8 mm, from about 0.05 mm to about 0.7 mm, from about 0.05 mm to about 0.6 mm, from about 0.05 mm to about 0.55 mm, from about 0.05 mm to about 0.5 mm, from about 0.05 mm to about 0.4 mm, from about 0.05 mm to about 0.3 mm, or from about 0.7 mm to about 1.5 mm.

In one or more embodiments, the curved glass substrate has a width (W) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, the curved glass substrate has a length (L) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, the first major concave surface 210 has a maximum radius of curvature of about 20 mm or greater, about 50 mm or greater, or about 100 mm or greater (e.g., about 125 mm or greater, 150 mm or greater, 175 mm or greater, 200 mm or greater, 250 mm or greater, 300 mm or greater, 350 mm or greater, 400 mm or greater, 500 mm or greater, 600 mm or greater, 750 mm or greater, 1000 mm or greater, 1250 mm or greater, 1500 mm or greater, 1750 mm or greater, 2000 mm or greater, 2250 mm or greater 2500 mm or greater).

In one or more embodiments, $CSmax_2$ is less than $CSmax_1$. In one or more embodiments, $CS_{max1}$ is greater than about 800 MPa. In one or more embodiments, CSmax1 is about 800 MPa or greater, about 820 MPa or greater, about 840 MPa or greater, about 850 MPa or greater, about 860 MPa or greater, about 880 MPa or greater, 900 MPa or greater, about 920 MPa or greater, about 940 MPa or greater, about 950 MPa or greater, about 960 MPa or greater, about 980 MPa or greater, about 1000 MPa or greater, about 1020 MPa or greater, about 1040 MPa or greater, about 1050 MPa or greater, about 1060 MPa or greater, about 1080 MPa or greater, about 1100 MPa or greater, about 1120 MPa or greater, about 1140 MPa or greater, about 1150 MPa or greater, about 1160 MPa or greater, about 1180 MPa or greater, about 1200 MPa or greater, about 1220 MPa or greater, about 1240 MPa or greater, about 1250 MPa or greater, about 1260 MPa or greater, about 1280 MPa or greater, or about 1300 MPa or greater. In one or more embodiments, the CSmax1 is in a range from about 800 MPa to about 1500 MPa, from about 820 MPa to about 1500 MPa, from about 840 MPa to about 1500 MPa, from about 850 MPa to about 1500 MPa, from about 860 MPa to about 1500 MPa, from about 880 MPa to about 1500 MPa, from about 900 MPa to about 1500 MPa, from about 920 MPa to about 1500 MPa, from about 940 MPa to about 1500 MPa, from about 950 MPa to about 1500 MPa, from about 960 MPa to about 1500 MPa, from about 980 MPa to about 1500

MPa, from about 1000 MPa to about 1500 MPa, from about 1020 MPa to about 1500 MPa, from about 1040 MPa to about 1500 MPa, from about 1050 MPa to about 1500 MPa, from about 1060 MPa to about 1500 MPa, from about 1080 MPa to about 1500 MPa, from about 1100 MPa to about 1500 MPa, from about 1120 MPa to about 1500 MPa, from about 1140 MPa to about 1500 MPa, from about 1150 MPa to about 1500 MPa, from about 1160 MPa to about 1500 MPa, from about 1180 MPa to about 1500 MPa, from about 1200 MPa to about 1500 MPa, from about 1220 MPa to about 1500 MPa, from about 1240 MPa to about 1500 MPa, from about 1250 MPa to about 1500 MPa, from about 1260 MPa to about 1500 MPa, from about 1280 MPa to about 1500 MPa, from about 1300 MPa to about 1500 MPa, from about 800 MPa to about 1480 MPa, from about 800 MPa to about 1460 MPa, from about 800 MPa to about 1450 MPa, from about 800 MPa to about 1440 MPa, from about 800 MPa to about 1420 MPa, from about 800 MPa to about 1400 MPa, from about 800 MPa to about 1380 MPa, from about 800 MPa to about 1360 MPa, from about 800 MPa to about 1350 MPa, from about 800 MPa to about 1340 MPa, from about 800 MPa to about 1320 MPa, from about 800 MPa to about 1300 MPa, from about 800 MPa to about 1280 MPa, from about 800 MPa to about 1260 MPa, from about 800 MPa to about 1250 MPa, from about 800 MPa to about 1240 MPa, from about 800 MPa to about 1220 MPa, from about 800 MPa to about 1210 MPa, from about 800 MPa to about 1200 MPa, from about 800 MPa to about 1180 MPa, from about 800 MPa to about 1160 MPa, from about 800 MPa to about 1150 MPa, from about 800 MPa to about 1140 MPa, from about 800 MPa to about 1120 MPa, from about 800 MPa to about 1100 MPa, from about 800 MPa to about 1080 MPa, from about 800 MPa to about 1060 MPa, from about 800 MPa to about 1050 MPa, or from about 950 MPa to about 1050 MPa, or from about 1000 MPa to about 1050 MPa.

In one or more embodiments, CSmax2 is about 600 MPa or greater, 620 MPa or greater, 640 MPa or greater, 650 MPa or greater, 660 MPa or greater, 680 MPa or greater, 700 MPa or greater, 720 MPa or greater, 740 MPa or greater, 750 MPa or greater, 760 MPa or greater, 780 MPa or greater, 800 MPa or greater, about 820 MPa or greater, about 840 MPa or greater, about 850 MPa or greater, about 860 MPa or greater, about 880 MPa or greater, 900 MPa or greater, about 920 MPa or greater, about 940 MPa or greater, about 950 MPa or greater, about 960 MPa or greater, about 980 MPa or greater, about 1000 MPa or greater, about 1020 MPa or greater, about 1040 MPa or greater, about 1050 MPa or greater, about 1060 MPa or greater, about 1080 MPa or greater, about 1100 MPa or greater, about 1120 MPa or greater, about 1140 MPa or greater, about 1150 MPa or greater, about 1160 MPa or greater, about 1180 MPa or greater, about 1200 MPa or greater, about 1220 MPa or greater, about 1240 MPa or greater, about 1250 MPa or greater, about 1260 MPa or greater, about 1280 MPa or greater, or about 1300 MPa or greater. In one or more embodiments, the CSmax1 is in a range from about 800 MPa to about 1500 MPa, from about 820 MPa to about 1500 MPa, from about 840 MPa to about 1500 MPa, from about 850 MPa to about 1500 MPa, from about 860 MPa to about 1500 MPa, from about 880 MPa to about 1500 MPa, from about 900 MPa to about 1500 MPa, from about 920 MPa to about 1500 MPa, from about 940 MPa to about 1500 MPa, from about 950 MPa to about 1500 MPa, from about 960 MPa to about 1500 MPa, from about 980 MPa to about 1500 MPa, from about 1000 MPa to about 1500 MPa, from about 1020 MPa to about 1500 MPa, from about 1040 MPa to about 1500 MPa, from about 1050 MPa to about 1500 MPa, from about 1060 MPa to about 1500 MPa, from about 1080 MPa to about 1500 MPa, from about 1100 MPa to about 1500 MPa, from about 1120 MPa to about 1500 MPa, from about 1140 MPa to about 1500 MPa, from about 1150 MPa to about 1500 MPa, from about 1160 MPa to about 1500 MPa, from about 1180 MPa to about 1500 MPa, from about 1200 MPa to about 1500 MPa, from about 1220 MPa to about 1500 MPa, from about 1240 MPa to about 1500 MPa, from about 1250 MPa to about 1500 MPa, from about 1260 MPa to about 1500 MPa, from about 1280 MPa to about 1500 MPa, from about 1300 MPa to about 1500 MPa, from about 800 MPa to about 1480 MPa, from about 800 MPa to about 1460 MPa, from about 800 MPa to about 1450 MPa, from about 800 MPa to about 1440 MPa, from about 800 MPa to about 1420 MPa, from about 800 MPa to about 1400 MPa, from about 800 MPa to about 1380 MPa, from about 800 MPa to about 1360 MPa, from about 800 MPa to about 1350 MPa, from about 800 MPa to about 1340 MPa, from about 800 MPa to about 1320 MPa, from about 800 MPa to about 1300 MPa, from about 800 MPa to about 1280 MPa, from about 800 MPa to about 1260 MPa, from about 800 MPa to about 1250 MPa, from about 800 MPa to about 1240 MPa, from about 800 MPa to about 1220 MPa, from about 800 MPa to about 1210 MPa, from about 800 MPa to about 1200 MPa, from about 800 MPa to about 1180 MPa, from about 800 MPa to about 1160 MPa, from about 800 MPa to about 1150 MPa, from about 800 MPa to about 1140 MPa, from about 800 MPa to about 1120 MPa, from about 800 MPa to about 1100 MPa, from about 800 MPa to about 1080 MPa, from about 800 MPa to about 1060 MPa, from about 800 MPa to about 1050 MPa, or from about 950 MPa to about 1050 MPa, or from about 1000 MPa to about 1050 MPa.

In one or more embodiments of the curved glass article, $DOC_1$ differs from $DOC_2$. In one or more embodiments, $DOC_1$ is greater than $DOC_2$. In one or more embodiments, one of both of the value of $DOC_1$ and $DOC_2$ of the curved glass article are about 0.2 t or less. For example, $DOC_1$ and/or $DOC_2$ may be about 0.18 t or less, about 0.18 t or less, about 0.16 t or less, about 0.15 t or less, about 0.14 t or less, about 0.12 t or less, about 0.1 t or less, about 0.08 t or less, about 0.06 t or less, about 0.05 t or less, about 0.04 t or less, or about 0.03 t or less. In one or more embodiments, $DOC_1$ and/or $DOC_2$ is in a range from about 0.02 t to about 0.2 t, from about 0.04 t to about 0.2 t, from about 0.05 t to about 0.2 t, from about 0.06 t to about 0.2 t, from about 0.08 t to about 0.2 t, from about 0.1 t to about 0.2 t, from about 0.12 t to about 0.2 t, from about 0.14 t to about 0.2 t, from about 0.15 t to about 0.2 t, from about 0.16 t to about 0.2 t, from about 0.02 t to about 0.18 t, from about 0.02 t to about 0.16 t, from about 0.02 t to about 0.15 t, from about 0.02 t to about 0.14 t, from about 0.02 t to about 0.12 t, from about 0.02 t to about 0.1 t, from about 0.02 t to about 0.08, from about 0.02 t to about 0.06 t, from about 0.02 t to about 0.05 t, from about 0.1 t to about 0.8 t, from about 0.12 t to about 0.16 t, or from about 0.14 t to about 0.17 t.

In one or more embodiments, when the curved glass article is in an uncurved configuration, the glass article comprises a maximum CT value ($CT_{uncurved-max}$) that is disposed at a depth from the first major surface in a range from about 0.25 t to about 0.75 t. In one or more such embodiments, $CT_{uncurved-max}$ is disposed at a depth in a range from about 0.25 t to about 0.74 t, from about 0.25 t to about 0.72 t, from about 0.25 t to about 0.70 t, from about 0.25 t to about 0.68 t, from about 0.25 t to about 0.66 t, from about 0.25 t to about 0.65 t, from about 0.25 t to about 0.62 t, from about 0.25 t to about 0.60 t, from about 0.25 t to about 0.58 t, from about 0.25 t to about 0.56 t, from about 0.25 t to about 0.55 t, from about 0.25 t to about 0.54 t, from about 0.25 t to about 0.52 t, from about 0.25 t to about 0.50 t, from about 0.26 t to about 0.75 t, from about 0.28 t to about 0.75 t, from about 0.30 t to about 0.75 t, from about 0.32 t to about 0.75 t, from about 0.34 t to about 0.75 t, from about 0.35 t to about 0.75 t, from about 0.36 t to about 0.75 t, from about 0.38 t to about 0.75 t, from about 0.40 t to about 0.75 t, from about 0.42 t to about 0.75 t, from about 0.44 t to about 0.75 t, from about 0.45 t to about 0.75 t, from about 0.46 t to about 0.75 t, from about 0.48 t to about 0.50 t, from about 0.30 t to about 0.70 t, from about 0.35 t to about 0.65 t, from about 0.4 t to about 0.6 t, or from about 0.45 t to about 0.55 t. In one or more embodiments, the foregoing ranges for the location of $CT_{uncurved-max}$ is present when the uncurved glass article has a radius of curvature of greater than about 5000 mm, or greater than about 10,000 mm.

In one or more embodiments, $CT_{uncurved-max}$ has a magnitude of less than about 400 MPa (e.g., about 390 MPa or less, 380 MPa or less, 375 MPa or less, 370 MPa or less, 360 MPa or less, 350 MPa or less, 340 MPa or less, 330 MPa or less, 325 MPa or less, 320 MPa or less, 310 MPa or less, 300 MPa or less, 275 MPa or less, 250 MPa or less, 225 MPa or less, 200 MPa or less, 175 MPa or less, 150 MPa or less, 125 MPa or less, 100 MPa or less, 90 MPa or less, 80 MPa or less, 75 MPa or less, 70 MPa or less, 65 MPa or less, 60 MPa or less, 55 MPa or less or about 50 MPa or less). The foregoing $CT_{uncurved-max}$ magnitude values are present when the $CS_{max1}$ is greater than about 800 MPa. In one or more embodiments, the glass article exhibits the relationship of $CT_{curved-max}/CT_{uncurved-max} \geq 1.4$ (e.g., 1.5 or greater, 1.6 or greater, 1.7 or greater, 1.8 or greater, 1.9 or greater or about 2 or greater).

In one or more embodiments, $CT_{curved-max}$ has a magnitude of less than about 400 MPa (e.g., about 390 MPa or less, 380 MPa or less, 375 MPa or less, 370 MPa or less, 360 MPa or less, 350 MPa or less, 340 MPa or less, 330 MPa or less, 325 MPa or less, 320 MPa or less, 310 MPa or less, 300 MPa or less, 275 MPa or less, 250 MPa or less, 225 MPa or less, 200 MPa or less, 175 MPa or less, 150 MPa or less, 125 MPa or less, 100 MPa or less, 90 MPa or less, 80 MPa or less, 75 MPa or less, 70 MPa or less, 65 MPa or less, 60 MPa or less, 55 MPa or less or about 50 MPa or less). In one or more embodiments, $CT_{curved-max}$ is in a range from about 30 MPa to about 80 MPa, from about 35 MPa to about 80 MPa, from about 40 MPa to about 80 MPa, from about 45 MPa to about 80 MPa, from about 50 MPa to about 80 MPa, from about 55 MPa to about 80 MPa, from about 60 MPa to about 80 MPa, from about 65 MPa to about 80 MPa, from about 70 MPa to about 80 MPa, from about 30 MPa to about 75 MPa, from about 30 MPa to about 70 MPa, from about 30 MPa to about 65 MPa, from about 30 MPa to about 60 MPa, from about 30 MPa to about 55 MPa, from about 30 MPa to about 50 MPa, from about 30 MPa to about 45 MPa, from about 30 MPa to about 40 MPa, from about 40 MPa to about 70 MPa, from about 50 MPa to about 70 MPa, or from about 60 MPa to about 80 MPa. Such ranges for CTcurved-max are present when the curved glass article has a radius of curvature in a range from about 250 mm to about 2500 mm, from about 300 mm to about 2500 mm, from about 350 mm to about 2500 mm, from about 400 mm to about 2500 mm, from about 450 mm to about 2500 mm, from about 500 mm to about 2500 mm, from about 550 mm to about 2500 mm, from about 600 mm to about 2500 mm, from about 650 mm to about 2500 mm, from about 700 mm to about 2500 mm, from about 750 mm to about 2500 mm, from about 800 mm to about 2500 mm, from about 900 mm to about 2500 mm, from about 1000 mm to about 2500 mm, from about 250 mm to about 2000 mm, from about 250 mm to about 1500 mm, from about 250 mm to about 1000 mm, from about 500 mm to about 1000 mm, from about 600 mm to about 1000 mm, from about 700 mm to about 1000 mm, and all ranges and sub-ranges of the foregoing.

In one or more embodiments, $CT_{curved-max}$ is disposed at a depth of about 0.12 t or less from the second convex major surface. For example, the depth of $CT_{curved-max}$ may be about 0.11 t or less, 0.1 t or less, 0.09 t or less, 0.08 t or less, 0.075 t or less, 0.07 t or less, 0.06 t or less, 0.05 t or less, 0.04 t or less, 0.03 t or less or about 0.025 t or less.

In one or more embodiments, CSmax1 of the curved glass article is about 900 MPa or greater, about 920 MPa or greater, about 940 MPa or greater, about 950 MPa or greater, about 960 MPa or greater, about 980 MPa or greater, about 1000 MPa or greater, about 1020 MPa or greater, about 1040 MPa or greater, about 1050 MPa or greater, about 1060 MPa or greater, about 1080 MPa or greater, about 1100 MPa or greater, about 1120 MPa or greater, about 1140 MPa or greater, about 1150 MPa or greater, about 1160 MPa or greater, about 1180 MPa or greater, about 1200 MPa or greater, about 1220 MPa or greater, about 1240 MPa or greater, about 1250 MPa or greater, about 1260 MPa or greater, about 1280 MPa or greater, or about 1300 MPa or greater. In one or more embodiments, the CSmax is in a range from about 900 MPa to about 1500 MPa, from about 920 MPa to about 1500 MPa, from about 940 MPa to about 1500 MPa, from about 950 MPa to about 1500 MPa, from about 960 MPa to about 1500 MPa, from about 980 MPa to about 1500 MPa, from about 1000 MPa to about 1500 MPa, from about 1020 MPa to about 1500 MPa, from about 1040 MPa to about 1500 MPa, from about 1050 MPa to about 1500 MPa, from about 1060 MPa to about 1500 MPa, from about 1080 MPa to about 1500 MPa, from about 1100 MPa to about 1500 MPa, from about 1120 MPa to about 1500 MPa, from about 1140 MPa to about 1500 MPa, from about 1150 MPa to about 1500 MPa, from about 1160 MPa to about 1500 MPa, from about 1180 MPa to about 1500 MPa, from about 1200 MPa to about 1500 MPa, from about 1220 MPa to about 1500 MPa, from about 1240 MPa to about 1500 MPa, from about 1250 MPa to about 1500 MPa, from about 1260 MPa to about 1500 MPa, from about 1280 MPa to about 1500 MPa, from about 1300 MPa to about 1500 MPa, from about 900 MPa to about 1480 MPa, from about 900 MPa to about 1460 MPa, from about 900 MPa to about 1450 MPa, from about 900 MPa to about 1440 MPa, from about 900 MPa to about 1420 MPa, from about 900 MPa to about 1400 MPa, from about 900 MPa to about 1380 MPa, from about 900 MPa to about 1360 MPa, from about 900 MPa to about 1350 MPa, from about 900 MPa to about 1340 MPa, from about 900 MPa to about 1320 MPa, from about 900 MPa to about 1300 MPa, from about 900 MPa to about 1280 MPa, from about 900 MPa to about 1260 MPa, from about 900 MPa to about 1250 MPa, from about 900 MPa to about 1240 MPa, from about 900 MPa to about 1220 MPa, from about 900 MPa to about 1210 MPa, from about 900 MPa to about 1200 MPa, from about 900 MPa to about 1180 MPa, from about 900 MPa to about 1160 MPa, from about 900 MPa to about 1150 MPa, from about 900 MPa to about 1140 MPa, from about 900 MPa to about 1120 MPa, from about 900 MPa to about 1100 MPa, from about 900 MPa to about 1080 MPa, from about 900 MPa to about 1060 MPa, from about 900 MPa to about 1050 MPa, or from about 950 MPa to about 1050 MPa, or from about 1000 MPa to about 1050 MPa. CSmax1 may be measured at a major surface or may be found at a depth from the major surface within the CS region.

In one or more embodiments, CSmax2 of the curved glass article has a value that is less than the value of CSmax1. In one or more embodiments, CSmax2 of the curved glass article is about 700 MPa or greater, about 750 MPa or greater, about 800 MPa or greater, about 850 MPa or greater, about 900 MPa or greater, about 920 MPa or greater, about 940 MPa or greater, about 950 MPa or greater, about 960 MPa or greater, about 980 MPa or greater, about 1000 MPa or greater, about 1020 MPa or greater, about 1040 MPa or greater, about 1050 MPa or greater, about 1060 MPa or greater, about 1080 MPa or greater, about 1100 MPa or greater, about 1120 MPa or greater, about 1140 MPa or greater, about 1150 MPa or greater, about 1160 MPa or greater, about 1180 MPa or greater, about 1200 MPa or greater, about 1220 MPa or greater, about 1240 MPa or greater, about 1250 MPa or greater, about 1260 MPa or greater, about 1280 MPa or greater, or about 1300 MPa or greater. In one or more embodiments, the CSmax is in a range from about 900 MPa to about 1500 MPa, from about 920 MPa to about 1500 MPa, from about 940 MPa to about 1500 MPa, from about 950 MPa to about 1500 MPa, from about 960 MPa to about 1500 MPa, from about 980 MPa to about 1500 MPa, from about 1000 MPa to about 1500 MPa, from about 1020 MPa to about 1500 MPa, from about 1040 MPa to about 1500 MPa, from about 1050 MPa to about 1500 MPa, from about 1060 MPa to about 1500 MPa, from about 1080 MPa to about 1500 MPa, from about 1100 MPa to about 1500 MPa, from about 1120 MPa to about 1500 MPa, from about 1140 MPa to about 1500 MPa, from about 1150 MPa to about 1500 MPa, from about 1160 MPa to about 1500 MPa, from about 1180 MPa to about 1500 MPa, from about 1200 MPa to about 1500 MPa, from about 1220 MPa to about 1500 MPa, from about 1240 MPa to about 1500 MPa, from about 1250 MPa to about 1500 MPa, from about 1260 MPa to about 1500 MPa, from about 1280 MPa to about 1500 MPa, from about 1300 MPa to about 1500 MPa, from about 900 MPa to about 1480 MPa, from about 900 MPa to about 1460 MPa, from about 900 MPa to about 1450 MPa, from about 900 MPa to about 1440 MPa, from about 900 MPa to about 1420 MPa, from about 900 MPa to about 1400 MPa, from about 900 MPa to about 1380 MPa, from about 900 MPa to about 1360 MPa, from about 900 MPa to about 1350 MPa, from about 900 MPa to about 1340 MPa, from about 900 MPa to about 1320 MPa, from about 900 MPa to about 1300 MPa, from about 900 MPa to about 1280 MPa, from about 900 MPa to about 1260 MPa, from about 900 MPa to about 1250 MPa, from about 900 MPa to about 1240 MPa, from about 900 MPa to about 1220 MPa, from about 900 MPa to about 1210 MPa, from about 900 MPa to about 1200 MPa, from about 900 MPa to about 1180 MPa, from about 900 MPa to about 1160 MPa, from about 900 MPa to about 1150 MPa, from about 900 MPa to about 1140 MPa, from about 900 MPa to about 1120 MPa, from about 900 MPa to about 1100 MPa, from about 900 MPa to about 1080 MPa, from about 900 MPa to about 1060 MPa, from about 900 MPa to about 1050 MPa, or from about 950 MPa to about 1050 MPa, or from about 1000 MPa to about 1050 MPa. CSmax2 may be measured at a major surface or may be found at a depth from the major surface within the CS region.

In one or more embodiments, one or both of $CSmax_1$ and $CSmax_2$ comprise a magnitude of 700 MPa or greater or about 800 MPa or greater at a depth of about 10 micrometers. At such a depth, one or both of $CSmax_1$ and $CSmax_2$ comprise a magnitude of 850 MPa or greater, 900 MPa or greater, 950 MPa or greater, 1000 MPa or greater, 1050 MPa or greater, 1100 MPa or greater, 1150 MPa or greater, or about 1200 MPa or greater.

In one or more embodiments, $CT_{curved-max}$ is disposed at a depth of about 0.12 t or less from the second convex major surface. For example, the depth of $CT_{curved-max}$ may be about 0.11 t or less, 0.1 t or less, 0.09 t or less, 0.08 t or less, 0.075 t or less, 0.07 t or less, 0.06 t or less, 0.05 t or less, 0.04 t or less, 0.03 t or less or about 0.025 t or less.

In one or more embodiments, the curved glass article comprises a conical surface, a cylindrical surface or a developable surface.

In one or more embodiments, either one of or both the first major surface and the second major surface comprises a surface treatment, as described with respect to the second aspect of this disclosure. In one or more embodiments, the surface treatment covers at least a portion of the first major surface and the second major surface.

In one or more embodiments, the curved glass article is substantially free of an anti-splinter layer (which may be a film or a coating).

In one or more embodiments, the curved glass article has a thickness in a range from about 0.05 mm to about 2 mm, a radius of curvature in a range from about 250 mm to about 2500 mm (e.g., from about 500 mm to about 2500 mm, from about 600 mm to about 2500 mm, from about 700 mm to about 2500 mm, from about 800 mm to about 2500 mm, from about 900 mm to about 2500 mm, or from about 1000 mm to about 2500 mm), and a $CT_{curved-max}$ magnitude of about 250 MPa or less (e.g., about 225 MPa or less, 200 MPa or less, 175 MPa or less, 150 MPa or less, 125 MPa or less, 100 MPa or less, 90 MPa or less, 80 MPa or less, 75 MPa or less, 70 MPa or less, 65 MPa or less, 60 MPa or less, 55 MPa or less or about 50 MPa or less).

The curved glass article of one or more embodiments, further comprises a frame, a display or touch panel disposed on the first or second major surface. In one or more specific embodiments, the curved glass article includes an adhesive disposed between the first or second major surface and the frame, display or touch panel. In one or more embodiments, the display may be liquid crystal display, an OLED display or the like.

Figure 6:
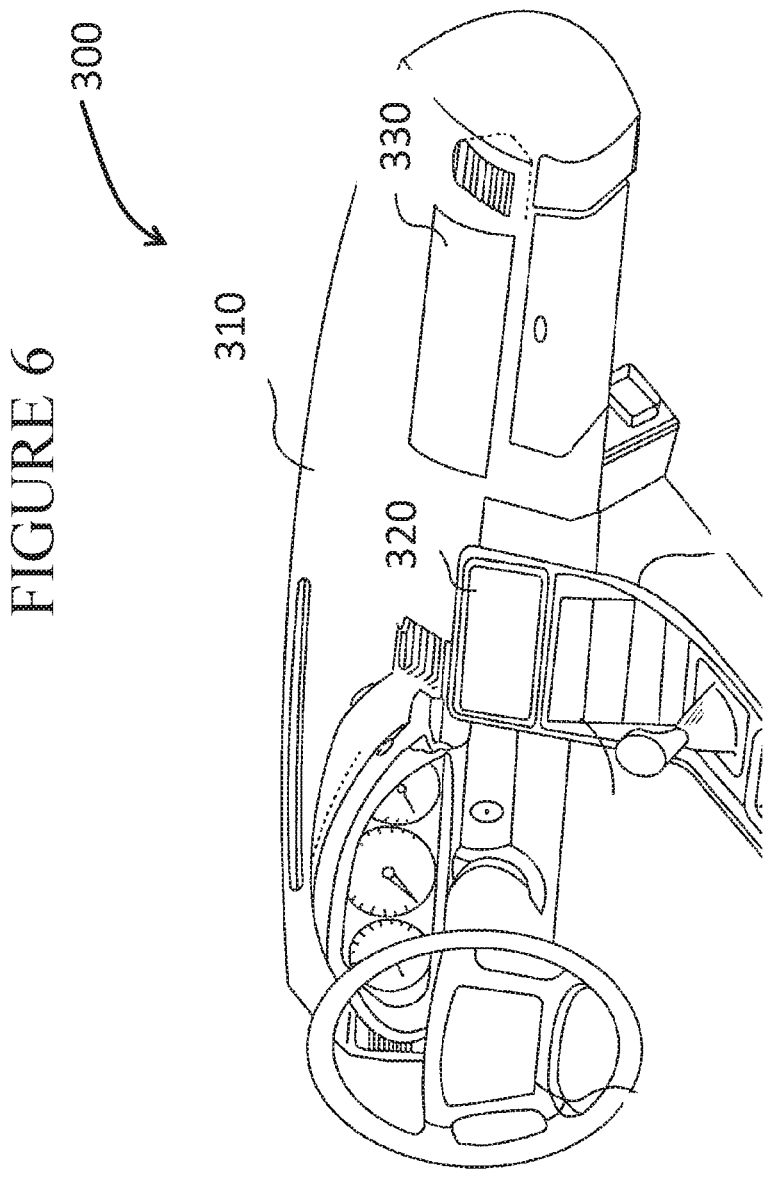
FIG. 6 is a perspective view of an automotive interior system according to one or more embodiments.

A fourth aspect of this disclosure pertains to an automotive interior system. As shown in FIG. 6, the automotive interior system 300 of one or more embodiments includes a base 310; and a glass article 320 or a curved glass article 330 disposed on the base. The automotive interior system may include a glass article according to one or more embodiments of the glass article according to the second aspect, or the curved glass article according to the third aspect. In one or more embodiments, the automotive interior system exhibits superior headform impact performance. For example, when an impactor having a mass of 6.8 kg impacts the first major surface of the glass article at an impact velocity of 5.35 m/s to 6.69 m/s, the deceleration of the impactor is 120 g (g-force) or less. The base 310 may include a dashboard, an arm rest, a pillar, a seat back, a floor board, a headrest, a door panel, or any portion of an automotive interior. In one or more embodiments, the deceleration of the impactor is not greater than 80 g for any 3 ms interval over a time of impact. In one or more embodiments of the automotive interior system, when the impactor breaks the glass article, the glass article ejects particles having a maximum dimension of 1 mm or less at a distance of 10 mm or less or about 5 mm or less from the glass article.

In one or more embodiments of the automotive interior system including curved glass article, the base may be curved and have a radius of curvature that is within 10% of the first radius of curvature of the curved glass article. In one or more embodiments the base may be substantially flat.

The automotive interior system may include a frame, touchpanel, and/or display disposed between the glass article and the base. In one or more embodiments, the automotive interior system includes an adhesive between the glass article and a frame. The automotive interior system may include an adhesive between the glass article and the display and/or touch panel.

A fifth aspect of this disclosure pertains to a method for forming a glass article. In one or more embodiments, the method includes strengthening a glass sheet having a first major surface, a second major surface, and a minor surface connecting the first major surface and the second major surface defining a thickness (t) to provide a first strengthened glass article as described herein in accordance with one or more embodiments. In one or more embodiments, strengthening the glass sheet comprises chemically strengthening the glass sheet. Chemically strengthening the glass sheet may include immersing the glass sheet in a molten salt bath of $KNO_3$, $NaNO_3$ or a combination of $KNO_3$ and $NaNO_3$, having a temperature in a range from about 310° C. to about 450° C., for a duration of from about 2 hours to about 40 hours to provide a strengthened glass article. In some embodiments, chemically strengthening the glass sheet comprises immersing the strengthened glass article (after immersion in a first molten salt bath) in a second a molten salt bath of $KNO_3$, $NaNO_3$ or a combination of $KNO_3$ and $NaNO_3$, having a temperature in a range from about 310° C. to about 450° C., for a duration of from about 2 hours to about 40 hours. Without being bound by theory, it is believed that ion exchanging the glass sheet in two successive molten salt baths provides a stress profile with a greater CSmax, while maintaining a near constant DOL value, when compared to glass sheets that are ion exchanged in a single molten salt bath.

In one or more embodiments, one or both of the molten salt baths includes an additional salt that may be one or more of: $K_2CO_3$, $Na_2CO_3$, $K_3PO_4$, $Na_3PO_4$, $K_2SO_4$, $Na_2SO_4$, $K_3BO_3$, $Na_3BO_3$, KCl, NaCl, KF, and NaF. The additional salt is added to a conventional molten salt bath (e.g., nitrates such as $KNO_3$ and/or $NaNO_3$) as a dissolved liquid solute so that the ion exchange process is carried out and IOX efficiency can be enhanced. The selection of the additional salt(s) and how to use them may be guided by thermochemical calculations of a molten nitrate salt of a metal ion with an additional salt of the same metal ion but differing anion. Two factors can be obtained from this thermochemical calculation. One factor is solubility of a salt in the molten nitrate salt, which determines an upper limit of the additional salt in the molten nitrate salt solution. A second factor is a ratio of oxide activities ($a_{K2O}/a_{Na2O}$) where $a_{K2O}$ and $a_{Na2O}$ are the activities of $K_2O$ and $Na_2O$, respectively. The ratio of oxide activities ($a_{K2O}/a_{Na2O}$) can be used as a merit parameter to measure the IOX efficiency of $K^+ \leftrightarrow Na^+$ ion exchange of a salt solution.

In one or more embodiments, the method includes curving the strengthened glass article to have a curved configuration. In one or more embodiments, the curved configuration is permanent.

In one or more embodiments, the method includes affixing a frame, display or touch panel to the glass article or curved glass article as described herein to provide a module; and affixing the module to a base of an automotive interior system. In one or more embodiments, affixing the frame, display or touch panel to the glass article comprises curving the glass article before affixing the display or touch panel to the curved glass article. In one or more embodiments, affixing the frame, display or touch panel to the glass article comprises curving the glass article simultaneously with affixing the display or touch panel to the curved glass article. In one or more embodiments, a portion of the first major surface of the curved glass article comprises a concave surface and the opposing portion of the second major surface comprises a convex surface.

In one or more embodiments, the method includes affixing the frame, display or touch panel to the first major surface. and optionally, affixing the frame, display or touch panel to the second major surface. In one or more embodiments, the method includes disposing an adhesive layer between the curved glass article and the frame, display or touch panel.

EXAMPLES

Various embodiments will be further clarified by the following examples.

Example 1

Glass articles according to the embodiments described herein were made using the glass compositions shown in Table 1 (Examples 1-21).

TABLE 1

Examples 1-21 of glass compositions used to form glass articles according to one or more embodiments.

| Composition (in mol %) | Examples | | | | |
| | 1 | 2 | 3 | 4 | 5 |
| --- | --- | --- | --- | --- | --- |
| $SiO_2$ | 66.6 | 66.5 | 66.6 | 66.6 | 66.6 |
| $Al_2O_3$ | 12.0 | 13.0 | 12.6 | 12.6 | 12.5 |
| $P_2O_5$ | 1.0 | 1.0 | 1.0 | 1.0 | 1.0 |
| $Na_2O$ | 16.0 | 15.0 | 15.4 | 15.9 | 14.4 |
| $K_2O$ | 0.5 | 0.5 | 0.5 | 0.0 | 0.5 |
| MgO | 0.0 | 0.0 | 0.0 | 0.0 | 0.0 |
| ZnO | 3.9 | 4.0 | 3.9 | 3.9 | 5.0 |
| SrO | 0.0 | 0.0 | 0.0 | 0.0 | 0.0 |
| $SnO_2$ | 0.1 | 0.1 | 0.1 | 0.1 | 0.1 |
| Density (g/cm³) | 2.493 | 2.488 | 2.49 | 2.489 | 2.502 |
| Strain Point (° C.) | 594 | 619 | 607 | 600 | 611 |
| Anneal Point (° C.) | 646 | 674 | 661 | 652 | 665 |
| Softening Point (° C.) | 890.6 | 931.1 | 915.5 | 912.8 | 925.2 |

TABLE 1-continued

Examples 1-21 of glass compositions used to form glass
articles according to one or more embodiments.

| | | | | | |
|---|---|---|---|---|---|
| $10^{11}$ Poise Temperature (° C.) | 731 | 764 | 750 | 740 | 755 |
| Coefficient of Thermal Expansion × $10^{-7}$ (1/° C.) | 86.3 | 82.7 | 84.1 | 82.7 | 79.9 |
| Stress Optical Coefficient (nm/mm/MPa) | 3.168 | 3.197 | 3.174 | 3.187 | 3.21 |
| Refractive Index | 1.5047 | 1.5047 | 1.5043 | 1.504 | 1.5059 |
| Fulchers A | −2.844 | −2.897 | −2.545 | −2.585 | −3.278 |
| Fulchers B | 8031.5 | 8254.6 | 7444.9 | 7484.5 | 9103.3 |
| Fulchers To | 72.8 | 85 | 175.1 | 173.3 | 74.2 |
| 200 Poise Temperature (° C.) | 1634 | 1673 | 1711 | 1705 | 1706 |
| 35000 Poise Temperature (° C.) | 1160 | 1194 | 1225 | 1223 | 1238 |
| 200000 Poise Temperature (° C.) | 1059 | 1092 | 1124 | 1122 | 1135 |
| Liquidus Temperature (° C.) | 995 | 1005 | 1020 | 1005 | 1030 |
| Liquidus Viscosity (kP) | 733 | 1190 | 1847 | 2594 | 1763 |
| Zircon Breakdown Temperature (° C.) | 1190 | 1190 | 1185 | 1195 | 1215 |
| Zircon Breakdown Viscosity (kP) | 22 | 37 | 67 | 55 | 50 |

| | Examples | | | | |
|---|---|---|---|---|---|
| Composition (in mol %) | 6 | 7 | 8 | 9 | 10 |
| $SiO_2$ | 66.6 | 66.4 | 66.4 | 66.4 | 66.5 |
| $Al_2O_3$ | 12.6 | 13.1 | 13.0 | 13.0 | 12.5 |
| $P_2O_5$ | 1.0 | 1.0 | 1.0 | 1.0 | 1.0 |
| $Na_2O$ | 14.9 | 15.4 | 15.0 | 14.4 | 13.5 |
| $K_2O$ | 0.0 | 0.0 | 0.0 | 0.0 | 0.5 |
| MgO | 0.0 | 0.0 | 0.0 | 0.0 | 2.8 |
| ZnO | 4.9 | 4.1 | 4.5 | 5.0 | 2.7 |
| SrO | 0.0 | 0.0 | 0.0 | 0.0 | 0.5 |
| $SnO_2$ | 0.1 | 0.1 | 0.1 | 0.1 | 0.1 |
| Density (g/cm$^3$) | 2.503 | 2.487 | 2.494 | 2.502 | 2.485 |
| Strain Point (° C.) | 614 | 617 | 617 | 619 | 621 |
| Anneal Point (° C.) | 668 | 672 | 672 | 673 | 672 |
| Softening Point (° C.) | 925.7 | 934.3 | 936.9 | 936.5 | 930.6 |
| $10^{11}$ Poise Temperature (° C.) | 757 | 763 | 763 | 763 | 759 |
| Coefficient of Thermal Expansion × $10^{-7}$ (1/° C.) | 79.2 | 81.2 | 79.2 | 76.9 | 78.1 |
| Stress Optical Coefficient (nm/mm/MPa) | 3.216 | 3.195 | 3.202 | 3.211 | 3.094 |
| Refractive Index | 1.5056 | 1.5037 | 1.5046 | 1.5054 | 1.505 |
| Fulchers A | −2.822 | −2.536 | −3.917 | −3.257 | −3.37 |
| Fulchers B | 7894.3 | 7379.3 | 10549.6 | 8945.8 | 9020 |
| Fulchers To | 159.3 | 204.1 | 1.1 | 108.5 | 99.8 |
| 200 Poise Temperature (° C.) | 1700 | 1730 | 1698 | 1718 | 1690 |
| 35000 Poise Temperature (° C.) | 1231 | 1246 | 1248 | 1255 | 1240 |
| 200000 Poise Temperature (° C.) | 1131 | 1146 | 1146 | 1154 | 1140 |
| Liquidus Temperature (° C.) | 1005 | 1030 | 1030 | 1035 | 1070 |
| Liquidus Viscosity (kP) | 3256 | 2505 | 2169 | 2503 | 845 |
| Zircon Breakdown Temperature (° C.) | 1220 | 1205 | 1180 | 1205 | 1210 |
| Zircon Breakdown Viscosity (kP) | 42 | 69 | 108 | 80 | 57 |

| | Examples | | | | |
|---|---|---|---|---|---|
| Composition (in mol %) | 11 | 12 | 13 | 14 | 15 |
| $SiO_2$ | 66.5 | 66.6 | 66.4 | 66.5 | 66.4 |
| $Al_2O_3$ | 12.5 | 12.6 | 12.5 | 12.5 | 12.5 |
| $P_2O_5$ | 1.0 | 0.9 | 1.0 | 1.0 | 1.0 |
| $Na_2O$ | 13.6 | 13.5 | 14.1 | 14.0 | 14.1 |
| $K_2O$ | 0.5 | 0.5 | 0.0 | 0.0 | 0.0 |
| MgO | 2.5 | 2.3 | 2.8 | 2.5 | 2.3 |
| ZnO | 2.4 | 2.2 | 2.7 | 2.4 | 2.2 |
| SrO | 1.0 | 1.5 | 0.5 | 1.0 | 1.5 |
| $SnO_2$ | 0.1 | 0.0 | 0.1 | 0.1 | 0.1 |
| Density (g/cm$^3$) | 2.491 | 2.495 | 2.485 | 2.49 | 2.496 |
| Strain Point (° C.) | 617 | 619 | 622 | 619 | 617 |
| Anneal Point (° C.) | 668 | 669 | 673 | 670 | 668 |
| Softening Point (° C.) | 930.8 | 932.9 | 930.9 | 927.8 | 928 |
| $10^{11}$ Poise Temperature (° C.) | 755 | 756 | 760 | 757 | 755 |
| Coefficient of Thermal Expansion × $10^{-7}$ (1/° C.) | 78.4 | 78.5 | 76.6 | 77 | 77.8 |
| Stress Optical Coefficient (nm/mm/MPa) | 3.074 | 3.067 | 3.114 | 3.082 | 3.061 |
| Refractive Index | 1.5051 | 1.506 | 1.5054 | 1.5057 | 1.506 |
| Fulchers A | −3.168 | −3.615 | −3.248 | −3.3 | −3.018 |
| Fulchers B | 8611.7 | 9857.5 | 8794.2 | 8929.5 | 8341.9 |
| Fulchers To | 120 | 19.2 | 87.8 | 96 | 123.9 |
| 200 Poise Temperature (° C.) | 1695 | 1685 | 1673 | 1690 | 1692 |
| 35000 Poise Temperature (° C.) | 1237 | 1227 | 1216 | 1234 | 1227 |
| 200000 Poise Temperature (° C.) | 1137 | 1125 | 1116 | 1134 | 1127 |

TABLE 1-continued

Examples 1-21 of glass compositions used to form glass
articles according to one or more embodiments.

| Liquidus Temperature (° C.) | 1080 | 1110 | 1070 | 1095 | 1110 |
|---|---|---|---|---|---|
| Liquidus Viscosity (kP) | 635 | 264 | 508 | 435 | 276 |
| Zircon Breakdown Temperature (° C.) | 1220 | 1225 | 1230 | 1220 | 1220 |
| Zircon Breakdown Viscosity (kP) | 46 | 36 | 28 | 44 | 39 |

| | Examples | | | | |
|---|---|---|---|---|---|
| Composition (in mol %) | 16 | 17 | 18 | 19 | 20 |
| $SiO_2$ | 66.9 | 66.4 | 66.9 | 66.6 | 66.6 |
| $Al_2O_3$ | 12.61 | 12.60 | 12.58 | 12.59 | 12.60 |
| $P_2O_5$ | 0.49 | 0.98 | 0.49 | 0.73 | 0.73 |
| $Na_2O$ | 14.00 | 14.01 | 14.00 | 14.00 | 14.06 |
| $K_2O$ | 0.01 | 0.01 | 0.01 | 0.01 | 0.01 |
| MgO | 2.76 | 3.54 | 3.53 | 2.77 | 3.53 |
| ZnO | 2.77 | 2.02 | 2.02 | 2.77 | 1.99 |
| SrO | 0.45 | 0.45 | 0.45 | 0.45 | 0.45 |
| $SnO_2$ | 0.05 | 0.05 | 0.05 | 0.05 | 0.05 |
| Density ($g/cm^3$) | 2.484 | 2.473 | 2.474 | 2.484 | 2.473 |
| Strain Point (° C.) | 626 | 628 | 628 | 625 | 629 |
| Anneal Point (° C.) | 680 | 681 | 682 | 678 | 681 |
| Softening Point (° C.) | 937 | 939 | 938.5 | 936.3 | 936.1 |
| $10^{11}$ Poise Temperature (° C.) | 769 | 769 | 771 | 767 | 768 |
| Coefficient of Thermal Expansion × $10^{-7}$ (1/° C.) | | | | | |
| Stress Optical Coefficient (nm/mm/MPa) | 3.108 | 3.077 | 3.057 | 3.079 | 3.109 |
| Refractive Index | | | | | |
| Fulchers A | | | | | |
| Fulchers B | | | | | |
| Fulchers To | | | | | |
| 200 Poise Temperature (° C.) | | | | | |
| 35000 Poise Temperature (° C.) | | | | | |
| 200000 Poise Temperature (° C.) | | | | | |
| Liquidus Temperature (° C.) | | | | | |
| Liquidus Viscosity (kP) | | | | | |
| Zircon Breakdown Temperature (° C.) | | | | | |
| Zircon Breakdown Viscosity (kP) | | | | | |

| | Examples |
|---|---|
| Composition (in mol %) | 21 |
| $SiO_2$ | 67.1 |
| $Al_2O_3$ | 12.61 |
| $P_2O_5$ | 0.25 |
| $Na_2O$ | 14.03 |
| $K_2O$ | 0.01 |
| MgO | 3.53 |
| ZnO | 2.01 |
| SrO | 0.45 |
| $SnO_2$ | 0.05 |
| Density ($g/cm^3$) | 2.475 |
| Strain Point (° C.) | 628 |
| Anneal Point (° C.) | 682 |
| Softening Point (° C.) | 938.4 |
| $10^{11}$ Poise Temperature (° C.) | 771 |
| Coefficient of Thermal Expansion × $10^{-7}$ (1/° C.) | |
| Stress Optical Coefficient (nm/mm/MPa) | 3.066 |
| Refractive Index | |
| Fulchers A | |
| Fulchers B | |
| Fulchers To | |
| 200 Poise Temperature (° C.) | |
| 35000 Poise Temperature (° C.) | |
| 200000 Poise Temperature (° C.) | |
| Liquidus Temperature (° C.) | |
| Liquidus Viscosity (kP) | |
| Zircon Breakdown Temperature (° C.) | |
| Zircon Breakdown Viscosity (kP) | |

The glass articles of Examples 1-21 were chemically strengthened by immersing each article in a molten salt bath of 100% $KNO_3$ having a temperature of 390° C. for 4 hours, 6 hours or 8 hours, as shown in Table 2.

TABLE 2

Chemical strengthening conditions and
CS values at measured DOL values.

| Ion Exchange Conditions | Examples | | | | |
| --- | --- | --- | --- | --- | --- |
|  | 1 | 2 | 3 | 4 | 5 |
| Bath temperature: 390° C. Bath Composition: 100% $KNO_3$ Immersion time: 4 hours Glass thickness: 1.0 mm) | | | | | |
| Compressive Stress (MPa) | 961 | 1018 | 1016 | 1035 | 1028 |
| Depth of Layer (microns) | 37 | 37 | 38 | 35 | 33 |
| Bath temperature: 390° C. Bath Composition: 100% $KNO_3$ Immersion time: 6 hours Glass thickness: 1.0 mm | | | | | |
| Compressive Stress (MPa) | 932 | 1008 | 998 | 1020 | 1012 |
| Depth of Layer (microns) | 44 | 44 | 45 | 41 | 40 |
| Bath temperature: 390° C. Bath Composition: 100% $KNO_3$ Immersion time: 8 hours Glass thickness: 1.0 mm | | | | | |
| Compressive Stress (MPa) | 917 | 994 | 980 | 1001 | 1000 |
| Depth of Layer (microns) | 50 | 51 | 51 | 48 | 45 |

| Ion Exchange Conditions | Examples | | | | |
| --- | --- | --- | --- | --- | --- |
|  | 6 | 7 | 8 | 9 | 10 |
| Bath temperature: 390° C. Bath Composition: 100% $KNO_3$ Immersion time: 4 hours Glass thickness: 1.0 mm) | | | | | |
| Compressive Stress (MPa) | 1060 | 1065 | 1072 | 1075 | 1033 |
| Depth of Layer (microns) | 30 | 34 | 32 | 30 | 31 |
| Bath temperature: 390° C. Bath Composition: 100% $KNO_3$ Immersion time: 6 hours Glass thickness: 1.0 mm | | | | | |
| Compressive Stress (MPa) | 1045 | 1052 | 1062 | 1064 | 1031 |
| Depth of Layer (microns) | 37 | 41 | 39 | 36 | 37 |
| Bath temperature: 390° C. Bath Composition: 100% $KNO_3$ Immersion time: 8 hours Glass thickness: 1.0 mm | | | | | |
| Compressive Stress (MPa) | 1030 | 1031 | 1048 | 1046 | 1022 |
| Depth of Layer (microns) | 42 | 48 | 44 | 42 | 43 |

| Ion Exchange Conditions | Examples | | | | |
| --- | --- | --- | --- | --- | --- |
|  | 11 | 12 | 13 | 14 | 15 |
| Bath temperature: 390° C. Bath Composition: 100% $KNO_3$ Immersion time: 4 hours Glass thickness: 1.0 mm) | | | | | |
| Compressive Stress (MPa) | 1035 | 1029 | 1061 | 1062 | 1054 |
| Depth of Layer (microns) | 31 | 30 | 28 | 28 | 28 |
| Bath temperature: 390° C. Bath Composition: 100% $KNO_3$ Immersion time: 6 hours Glass thickness: 1.0 mm | | | | | |
| Compressive Stress (MPa) | 1030 | 1023 | 1054 | 1056 | 1051 |
| Depth of Layer (microns) | 37 | 35 | 34 | 34 | 32 |
| Bath temperature: 390° C. Bath Composition: 100% $KNO_3$ Immersion time: 8 hours Glass thickness: 1.0 mm | | | | | |
| Compressive Stress (MPa) | 1024 | 1016 | 1046 | 1049 | 1045 |
| Depth of Layer (microns) | 41 | 41 | 39 | 38 | 37 |

TABLE 2-continued

Chemical strengthening conditions and
CS values at measured DOL values.

| Ion Exchange Conditions | Examples | | | | |
| --- | --- | --- | --- | --- | --- |
|  | 16 | 17 | 18 | 19 | 20 |
| Bath temperature: 390° C. Bath Composition: 100% $KNO_3$ Immersion time: 4 hours Glass thickness: 1.0 mm) | | | | | |
| Compressive Stress (MPa) | 1063 | 1065 | 1071 | 1071 | 1062 |
| Depth of Layer (microns) | 26 | 30 | 26 | 28 | 28 |
| Bath temperature: 390° C. Bath Composition: 100% $KNO_3$ Immersion time: 6 hours Glass thickness: 1.0 mm | | | | | |
| Compressive Stress (MPa) | | 1060 | 1069 | 1071 | 1056 |
| Depth of Layer (microns) | | 36 | 31 | 34 | 34 |
| Bath temperature: 390° C. Bath Composition: 100% $KNO_3$ Immersion time: 8 hours Glass thickness: 1.0 mm | | | | | |
| Compressive Stress (MPa) | 1059 | 1059 | 1067 | 1065 | 1048 |
| Depth of Layer (microns) | 33 | 39 | 33 | 36 | 36 |

| Ion Exchange Conditions | Examples 21 |
| --- | --- |
| Bath temperature: 390° C. Bath Composition: 100% $KNO_3$ Immersion time: 4 hours Glass thickness: 1.0 mm) | |
| Compressive Stress (MPa) | 1081 |
| Depth of Layer (microns) | 25 |
| Bath temperature: 390° C. Bath Composition: 100% $KNO_3$ Immersion time: 6 hours Glass thickness: 1.0 mm | |
| Compressive Stress (MPa) | 1065 |
| Depth of Layer (microns) | 30 |
| Bath temperature: 390° C. Bath Composition: 100% $KNO_3$ Immersion time: 8 hours Glass thickness: 1.0 mm | |
| Compressive Stress (MPa) | 1078 |
| Depth of Layer (microns) | 32 |

A known aluminosilicate glass article having a glass composition of 69 mol % $SiO_2$, 10 mol % $Al_2O_3$, 15 mol % $Na_2O$, 0.01 $K_2O$, 5.5 mol % MgO, 0.01 mol % $Fe_2O_3$, 0.01 mol % $ZrO_2$ and 0.13 mol % $SnO_2$, having a thickness of 1 mm (Comparative Example A) was ion exchanged by immersing in a 100 mol % $KNO_3$ molten salt bath to achieve the same DOL as Example 13. At this DOL, Comparative Example A had a CS that was approximately 70 MPa less than Example 13.

A known aluminosilicate glass article having a glass composition of 67 mol % $SiO_2$, 3 mol % $B_2O_3$, 12.75 mol % $Al_2O_3$, 13.75 mol % $Na_2O$, 0.01 $K_2O$, 2.4 mol % MgO, 0.01 mol % $Fe_2O_3$, 0.01 mol % $ZrO_2$ and 0.09 mol % $SnO_2$, having a thickness of 1 mm (Comparative Example B) was ion exchanged by immersing in a 100 mol % $KNO_3$ molten salt bath to achieve the same DOL as Example 13. At this DOL, Comparative Example B had a CS that was approximately 100 MPa less than Example 13.

Aspect (1) of this disclosure pertains to a glass article comprising a glass composition, the glass composition comprising: $SiO_2$ in an amount of about 65 mol % or greater; $Al_2O_3$ in an amount of about 8 mol % or greater; $Na_2O$ in an amount from about 3.5 mol % to about 16 mol %; $P_2O_5$; and ZnO, wherein $P_2O_5$ is present in an amount up to about 5 mol %, and wherein ZnO is present in an amount up to about 15 mol %.

Aspect (2) of this disclosure pertains to the glass article of Aspect (1), wherein the glass composition comprises $SiO_2$ in an amount in a range from about 65 mol % to about 77 mol %; and $Al_2O_3$ in an amount in a range from about 8 mol % to about 24 mol %.

Aspect (3) of this disclosure pertains to the glass article of Aspect (1) or Aspect (2), wherein the glass composition comprises $K_2O$ in an amount from about 0 mol % to about 11 mol %; MgO in an amount from about 0 mol % to about 13 mol %; and SrO in an amount from about 0 mol % to about 11.5 mol %.

Aspect (4) of this disclosure pertains to the glass article of any one of Aspects (1) through (3), wherein the glass composition comprises $SnO_2$ in an amount from about 0 mol % to about 0.5 mol %.

Aspect (5) of this disclosure pertains to the glass article of any one of Aspects (1) through (4), wherein the glass composition comprises $SiO_2$ in an amount from about 65 mol % to about 68 mol %; and $Al_2O_3$ in an amount from about 10 mol % to about 15 mol %.

Aspect (6) of this disclosure pertains to the glass article of any one of Aspects (1) through (5), wherein the glass composition comprises $P_2O_5$ in an amount up to about 2 mol %.

Aspect (7) of this disclosure pertains to the glass article of any one of Aspects (1) through (6), wherein the glass composition comprises $Na_2O$ in an amount from about 10 mol % to about 16 mol %.

Aspect (7) of this disclosure pertains to a glass article comprising a glass composition, the glass composition comprising: $SiO_2$ in an amount of about 56 mol % or greater; $Al_2O_3$ in an amount of about 8 mol % or greater; $Na_2O$ in an amount from about 3.5 mol % to about 16 mol %; $P_2O_5$; and ZnO, wherein $P_2O_5$ is present in an amount up to about 1 mol %, and wherein ZnO is present in an amount up to about 15 mol %.

Aspect (8) pertains to a glass article comprising a glass composition, the glass composition comprising: $SiO_2$ in an amount of about 56 mol % or greater; $Al_2O_3$ in an amount of about 8 mol % or greater; $Na_2O$ in an amount from about 3.5 mol % to about 16 mol %; $P_2O_5$; and ZnO, wherein $P_2O_5$ is present in an amount up to about 1 mol %, and wherein ZnO is present in an amount up to about 15 mol %.

Aspect (9) pertains to the glass article of Aspect (8), wherein the glass composition comprises $SiO_2$ in an amount in a range from about 56 mol % to about 77 mol %; and $Al_2O_3$ in an amount in a range from about 8 mol % to about 24 mol %.

Aspect (10) pertains to the glass article of Aspect (8) or Aspect (9), wherein the glass composition comprises $K_2O$ in an amount from about 0 mol % to about 11 mol %; MgO in an amount from about 0 mol % to about 13 mol %; and SrO in an amount from about 0 mol % to about 11.5 mol %.

Aspect (11) pertains to the glass article of any one of Aspects (8) through (10), wherein the glass composition comprises $SnO_2$ in an amount from about 0 mol % to about 0.5 mol %.

Aspect (12) pertains to the glass article of any one of Aspects (8) through (11), wherein the glass composition comprises $SiO_2$ in an amount from about 65 mol % to about 77 mol %; and $Al_2O_3$ in an amount from about 10 mol % to about 15 mol %.

Aspect (13) pertains to the glass article of any one of Aspects (8) through (12), wherein the glass composition comprises $SiO_2$ in an amount from about 65 mol % to about 68 mol %.

Aspect (14) pertains to the glass article of any one of Aspects (8) through (13), wherein the glass composition comprises $Na_2O$ in an amount from about 10 mol % to about 16 mol %.

Aspect (15) pertains to the glass article of any one of Aspects (1) through (14), further comprising: a first major surface, a second major surface opposing the first major surface, a minor surface connecting the first major surface and the second major surface defining a thickness (t) (millimeters); a compressive stress (CS) region extending from the first major surface to a depth of compression (DOC), the CS region comprising a maximum CS magnitude ($CS_{max}$) of about 900 MPa or greater and a CS magnitude of 750 MPa or greater at a depth of about 5 micrometers; and a central tension (CT) region having a maximum CT magnitude ($CT_{max}$) disposed at a depth from the first major surface in a range from about 0.25 t to about 0.75 t, wherein the CS region and the CT region define a stress profile along the thickness.

Aspect (16) pertains to the glass article of Aspect (15), wherein the $CT_{max}$ magnitude is about 80 MPa or less.

Aspect (17) pertains to the glass article of Aspect (15) or (16), wherein the all points of the CT region within 0.1 t from the depth of $CT_{max}$ comprise a tangent having a non-zero slope.

Aspect (18) pertains to the glass article of any one of Aspects (15) through (17), wherein the DOC that is about 0.2 t or less.

Aspect (19) pertains to the glass article of Aspect (18), wherein the DOC is about 0.1 t or less.

Aspect (20) pertains to the glass article of any one of Aspects (15) through (19), wherein the $CT_{max}$ is disposed at a depth from the first major surface in a range from about 0.4 t to about 0.6 t.

Aspect (21) pertains to the glass article of any one of Aspects (15) through (20), wherein at least a portion of the stress profile comprises a spike region extending from the first major surface, a tail region and a knee region between the spike region and the tail region, wherein all points of the stress profile in the spike region comprise a tangent having a slope in magnitude that is in a range from about 15 MPa/micrometer to about 200 MPa/micrometer and all points in the tail region comprise a tangent having a slope in magnitude that is in a range from about 0.01 MPa/micrometer to about 3 MPa/micrometer.

Aspect (22) pertains to the glass article of Aspect (21), wherein the CS magnitude in the knee region is in a range from greater than 200 MPa to about 1500 MPa.

Aspect (23) pertains to the glass article of any one of Aspects (21) through (22), wherein the knee region comprises a CS value in a range from about 5 MPa to about 200 MPa.

Aspect (24) pertains to the glass article of any one of Aspects (21) through (23), wherein the knee region extends from about 10 micrometers to about 50 micrometers from the first major surface.

Aspect (25) pertains to the glass article of any one of Aspects (21) through (24), wherein the tail region extends from about the knee region to the depth of $CT_{max}$.

Aspect (26) pertains to the glass article of any one of Aspects (21) through (25), wherein the tail region comprises one or both of a compressive stress tail region, and a tensile stress tail region.

Aspect (27) pertains to the glass article of any one of Aspects (15) through (26), wherein the glass article is in a substantially flat configuration or a permanently curved configuration.

Aspect (28) pertains to the glass article of any one of Aspects (15) through (27), further comprising a frame, a display or touch panel disposed on the first or second major surface.

Aspect (29) pertains to the glass article of Aspect (28), further comprising an adhesive disposed between the first or second major surface and the frame, display or touch panel.

Aspect (30) pertains to the glass article of any one of Aspects (15) through (29), wherein t is in a range from about 0.05 mm to about 2 mm.

Aspect (31) pertains to the glass article of any one of Aspects (15) through (30), wherein either one of or both the first major surface and the second major surface comprises a surface treatment.

Aspect (32) pertains to the glass article of Aspect (31), wherein the surface treatment covers at least a portion of the first major surface and the second major surface.

Aspect (33) pertains to the glass article of Aspect (31) or (32), wherein the surface treatment comprises any one of an easy-to-clean surface, an anti-glare surface, an anti-reflective surface, a haptic surface, and a decorative surface.

Aspect (34) pertains to the glass article of Aspect (33), wherein the surface treatment comprises at least two of any one of an easy-to-clean surface, an anti-glare surface, an anti-reflective surface, a haptic surface, and a decorative surface.

Aspect (35) pertains to the glass article of Aspect (34), wherein one of the first major surface and the second major surface comprises the anti-glare surface and the other of the first major surface and the second major surface comprises the anti-reflective surface.

Aspect (36) pertains to the glass article of Aspect (34), wherein the first major surface comprises either one of or both the anti-glare surface and the anti-reflective surface, and the second major surface comprises the decorative surface.

Aspect (37) pertains to the glass article of Aspect (34), wherein the first major surface comprises the anti-reflective surface, and the second major surface comprises one or both the anti-glare surface and the decorative surface.

Aspect (38) pertains to the glass article of Aspect (34), wherein the decorative surface is disposed on at least a portion of the periphery and the interior portion is substantially free of the decorative surface.

Aspect (39) pertains to the glass article of any one of Aspects (34) through (38), wherein the decorative surface comprises any one of a wood-grain design, a brushed metal design, a graphic design, a portrait, and a logo.

Aspect (40) pertains to the glass article of any one of Aspects (34) through (39), wherein the anti-glare surface comprises an etched surface, and wherein the anti-reflective surface comprises a multi-layer coating.

Aspect (41) pertains to the glass article of any one of Aspects (15) through (40), wherein the glass article is substantially free of an anti-splinter film.

Aspect (42) pertains to the glass article of any one of Aspects (15) through (41), wherein, when the glass article is curved from a substantially flat configuration to a curved configuration such that the first major surface comprises a concave shape having a radius of curvature of about 250 mm, the CSmax increases by more than about 8 mol %.

Aspect (43) pertains to the glass article of any one of Aspects (15) through (42), when the glass article is curved from a substantially flat configuration to a curved configuration such that the first major surface comprises a concave shape having a radius of curvature of about 500 mm, the $DOC_1$ increases by more than about 300 mol %, and a second depth of compression ($DOC_2$) measured from the second major surface decreases by less than 15 mol %.

Aspect (44) pertains to the glass article of any one of Aspects (15) through (43), wherein, when the glass article is curved from a substantially flat configuration to a curved configuration such that the first major surface comprises a concave shape having a radius of curvature of about 250 mm, the $DOC_1$ increases by more than about 600 mol %, and a second depth of compression ($DOC_2$) measured from the second major surface decreases by about less than 25 mol %.

Aspect (45) pertains to the glass article of Aspect (44), wherein the CTmax increases by 250 mol % or less.

Aspect (46) pertains to the glass article of Aspect (45), wherein the CTmax increases by 400 mol % or less.

Aspect (47) pertains to the glass article of any one of Aspects (1) through (14), further comprising: a first major concave surface, a second major convex surface opposing the first major concave surface, a minor surface connecting the first major concave surface and the second major convex surface defining a thickness (t) (millimeters); the first major concave surface comprising a maximum radius of curvature of about 100 mm or greater and a first compressive stress (CS) region extending from the first major concave surface to a first depth of compressive stress ($DOC_1$), the first CS region having a first maximum CS value ($CS_{max1}$) of greater than about 800 MPa; the second major convex surface comprising a second CS region extending from the second major convex surface to a second depth of compressive stress ($DOC_2$), the second CS region having a second maximum CS value ($CSmax2$); a central tension (CT) region disposed between the first CS region and the second CS region having a maximum CT value ($CT_{curved-max}$), wherein the CS region and the CT region define a stress profile along the thickness; wherein the $CSmax_2$ is less than $CSmax_1$.

Aspect (48) pertains to the glass article of Aspect (47), wherein $DOC_1$ differs from $DOC_2$.

Aspect (49) pertains to the curved glass article of Aspect (47) or Aspect (48), wherein, when the glass article is in an uncurved configuration, the glass article comprises a maximum CT value ($CT_{uncurved-max}$) that is disposed at a depth from the first major surface in a range from about 0.25 t to about 0.75 t.

Aspect (50) pertains to the curved glass article of any one of Aspects (47) through (49), wherein $CT_{curved-max}$ is less than about 400 MPa.

Aspect (51) pertains to the curved glass article of Aspect (50), wherein, $CT_{uncurved-max}$ is about 80 MPa or less, and wherein $CT_{curved-max}/CT_{uncurved-max}$ in a range from about greater than 1 to about 2.

Aspect (52) pertains to the curved glass article of any one of Aspects (47) through (51), wherein one or both of $CSmax_1$ and $CSmax_2$ comprise a magnitude of 750 MPa or greater at a depth of about 5 micrometers.

Aspect (53) pertains to the curved glass article of any one of Aspects (47) through (52), wherein the glass article comprises a conical surface, a cylindrical surface or a developable surface.

Aspect (54) pertains to the curved glass article of any one of Aspects (47) through (53), wherein t is in a range from about 0.1 mm to about 2 mm.

Aspect (55) pertains to the curved glass article of any one of Aspects (47) through (54), wherein either one of or both the first major surface and the second major surface comprises a surface treatment.

Aspect (56) pertains to the curved glass article of Aspect (55), wherein the surface treatment covers at least a portion of the first major surface and the second major surface.

Aspect (57) pertains to the curved glass article of Aspect (55) or Aspect (56), wherein the surface treatment comprises any one of an easy-to-clean surface, an anti-glare surface, an anti-reflective surface, a haptic surface, and a decorative surface.

Aspect (58) pertains to the curved glass article of any one of Aspects (47) through (57), wherein the curved glass article is substantially free of an anti-splinter film.

Aspect (59) pertains to the curved glass article of any one of Aspects (47) through (58), wherein the thickness is in a range from about 0.05 mm to about 2 mm, the radius of curvature is in a range from about 250 mm to about 2500 mm, and the $CT_{curved-max}$ is about 250 MPa or less.

Aspect (60) pertains to the curved glass article of Aspect (59), wherein the radius of curvature is in a range from about 500 mm to about 2500 mm, and the CTcurved-max is about 150 MPa or less.

Aspect (61) pertains to the curved glass article of Aspect (59) or Aspect (60), wherein the radius of curvature is in a range from about 600 mm to about 2500 mm, and the $CT_{curved-max}$ is about 90 MPa or less.

Aspect (62) pertains to the curved glass article of any one of Aspects (59) through (61), wherein the radius of curvature is in a range from about 700 mm to about 2500 mm, and the $CT_{curved-max}$ is about 70 MPa or less.

Aspect (63) pertains to the curved glass article of Aspect (62), wherein the radius of curvature is in a range from about 800 mm to about 2500 mm.

Aspect (64) pertains to the curved glass article of Aspect (62), wherein the radius of curvature is in a range from about 900 mm to about 2500 mm.

Aspect (65) pertains to the curved glass article of any one of Aspects (59) through (64), wherein the radius of curvature is in a range from about 1000 mm to about 2500 mm, and the $CT_{curved-max}$ is about 60 MPa or less.

Aspect (66) pertains to the curved glass article of any one of Aspects (47) through (65), wherein $CT_{curved-max}$ is disposed at a depth of about 0.12 t or less from the second convex major surface.

Aspect (67) pertains to the curved glass article of any one of Aspects (47) through (66), wherein $DOC_1$ is greater than $DOC_2$.

Aspect (68) pertains to the curved glass article of any one of Aspects (47) through (67), further comprising a frame, a display or touch panel disposed on the first or second major surface.

Aspect (69) pertains to the curved glass article of Aspect (68) further comprising an adhesive disposed between the first or second major surface and the frame, display or touch panel.

Aspect (70) pertains to an automotive interior system comprising: a base; and a glass article according to any one of Aspects (1) through (69) disposed on the base, an wherein, when an impactor having a mass of 6.8 kg impacts the first major surface at an impact velocity of 5.35 m/s to 6.69 m/s, the deceleration of the impactor is 120 g (g-force) or less.

Aspect (71) pertains to the automotive interior system of Aspect (70), wherein the deceleration of the impactor is not greater than 80 g for any 3 ms interval over a time of impact.

Aspect (72) pertains to the automotive interior system of Aspect (70) or Aspect (71), wherein, when the impactor breaks the glass article, the glass article ejects particles having a maximum dimension of 1 mm or less at a distance of 10 mm or less for the glass article.

Aspect (73) pertains to the automotive interior system of any one of Aspects (70) through (72), wherein the base is curved and has a radius of curvature that is within 10 mol % of the first radius of curvature.

Aspect (74) pertains to the automotive interior system of any one of Aspects (70) through (72), wherein the base is flat.

Aspect (75) pertains to a method for forming a glass article comprising: strengthening a glass sheet having a first major surface, a second major surface, and a minor surface connecting the first major surface and the second major surface defining a thickness (t) to provide a first strengthened glass article according to any one of Aspects (15) through (46).

Aspect (76) pertains to the method of Aspect (75), further comprising curving the strengthened glass article to have a curved configuration.

Aspect (77) pertains to the method of Aspect (76), wherein the curved configuration is permanent.

Aspect (78) pertains to the method of any one of Aspects (75) through (77), wherein strengthening the glass sheet comprises chemically strengthening the glass sheet.

Aspect (79) pertains to the method of Aspect (78), wherein chemically strengthening the glass sheet comprises immersing the glass sheet in a molten salt bath of $KNO_3$, $NaNO_3$ or a combination of $KNO_3$ and $NaNO_3$, having a temperature in a range from about 310° C. to about 450° C., for a duration of from about 2 hours to about 40 hours.

Aspect (80) pertains to the method of Aspect (79), wherein chemically strengthening the glass sheet comprises immersing the glass sheet in a second a molten salt bath of $KNO_3$, $NaNO_3$ or a combination of $KNO_3$ and $NaNO_3$, having a temperature in a range from about 310° C. to about 450° C., for a duration of from about 2 hours to about 40 hours.

Aspect (81) pertains to a method for forming an automotive interior system comprising: affixing a frame, display or touch panel to the glass article according to any one of Aspects (1) through (69) to provide a module; and affixing the module to a base of an automotive interior system.

Aspect (82) pertains to the method of Aspect (81), wherein affixing the frame, display or touch panel to the glass article comprises curving the glass article before affixing the display or touch panel to the curved glass article.

Aspect (83) pertains to the method of Aspect (82), wherein affixing the frame, display or touch panel to the glass article comprises curving the glass article simultaneously with affixing the display or touch panel to the curved glass article.

Aspect (84) pertains to the method of any one of Aspects (81) through (83), wherein a portion of the first major surface of the curved glass article comprises a concave surface and the opposing portion of the second major surface comprises a convex surface.

Aspect (85) pertains to the method of Aspect (84), further comprises affixing the frame, display or touch panel to the first major surface.

Aspect (86) pertains to the method of Aspect (84), further comprises affixing the frame, display or touch panel to the second major surface.

Aspect (87) pertains to the method of any one of Aspects (82) through (86), further comprises disposing an adhesive layer between the curved glass article and the frame, display or touch panel.

It will be apparent to those skilled in the art that various modifications and variations can be made without departing from the spirit or scope of the invention.

What is claimed is:

1. A glass article comprising a glass composition, the glass composition comprising:

$SiO_2$ in an amount from about 66 mol % to about 70 mol %;

$Al_2O_3$ in an amount from about 12 mol % to about 16 mol %;

$Na_2O$ in an amount from about 10 mol % to about 16 mol %;

$P_2O_5$ in an amount from 0.1 mol % to about 5 mol %; and

ZnO, wherein ZnO is present in an amount up to about 15 mol %, wherein the glass composition is substantially free of $Li_2O$;

a first major surface, a second major surface opposing the first major surface, a minor surface connecting the first major surface and the second major surface defining a thickness (t) (millimeters);

a compressive stress (CS) region extending from the first major surface to a depth of compression (DOC), the CS region comprising a maximum CS magnitude ($CS_{max}$) of about 900 MPa or greater and a CS magnitude of 750 MPa or greater at a depth of about 5 micrometers;

a central tension (CT) region having a maximum CT magnitude ($CT_{max}$) disposed at a depth from the first major surface in a range from about 0.25 t to about 0.75 t; and a depth of layer (DOL) of an exchanged ion greater than 30 μm, wherein the CS region and the CT region define a stress profile along the thickness, and wherein the glass composition exhibits a zircon break-down temperature less than 35 kP and a liquidus viscosity greater than 100 kP.

2. The glass article of claim 1, wherein the glass composition comprises $K_2O$ in an amount from about 0 mol % to about 11 mol %; MgO in an amount from about 0 mol % to about 13 mol %; and SrO in an amount from about 0 mol % to about 11.5 mol %.

3. The glass article of claim 1, wherein the glass composition comprises $SnO_2$ in an amount from about 0 mol % to about 0.5 mol %.

4. The glass article of claim 1, wherein the glass composition comprises $SiO_2$ in an amount from about 66 mol % to about 68 mol %; and $Al_2O_3$ in an amount from about 12 mol % to about 15 mol %.

5. The glass article of claim 1, wherein the glass composition comprises $P_2O_5$ in an amount up to about 2 mol %.

6. A glass article comprising a glass composition, the glass composition comprising:

$SiO_2$ in an amount from about 66 mol % to about 70 mol %;

$Al_2O_3$ in an amount from about 12 mol % to about 16 mol %;

$Na_2O$ in an amount from about 10 mol % to about 16 mol %;

$P_2O_5$ in an amount from 0.1 mol % to about 1 mol %; and

ZnO, wherein ZnO is present in an amount up to about 15 mol %, and wherein the glass composition is substantially free of $Li_2O$;

a first major surface, a second major surface opposing the first major surface, a minor surface connecting the first major surface and the second major surface defining a thickness (t) (millimeters);

a compressive stress (CS) region extending from the first major surface to a depth of compression (DOC), the CS region comprising a maximum CS magnitude ($CS_{max}$) of about 900 MPa or greater and a CS magnitude of 750 MPa or greater at a depth of about 5 micrometers;

a central tension (CT) region having a maximum CT magnitude ($CT_{max}$) disposed at a depth from the first major surface in a range from about 0.25 t to about 0.75 t; and a depth of layer (DOL) of an exchanged ion greater than 30 μm, wherein the CS region and the CT region define a stress profile along the thickness, and wherein the glass composition exhibits a zircon break-down temperature less than 35 kP and a liquidus viscosity greater than 100 kP.

7. The glass article of claim 6, wherein the glass composition comprises $K_2O$ in an amount from about 0 mol % to about 11 mol %; MgO in an amount from about 0 mol % to about 13 mol %; and SrO in an amount from about 0 mol % to about 11.5 mol %.

8. The glass article of claim 6, wherein the glass composition comprises $Al_2O_3$ in an amount from about 12 mol % to about 15 mol %.

9. The glass article of claim 6, wherein the glass composition comprises $SiO_2$ in an amount from about 66 mol % to about 68 mol %.

10. The glass article of claim 1, wherein the $CS_{max}$ is about 980 MPa or greater.

11. The glass article of claim 10, wherein the $CT_{max}$ magnitude is about 80 MPa or less.

12. The glass article of claim 10, wherein the glass article is in a substantially flat configuration or a permanently curved configuration.

13. The glass article of claim 10, further comprising a frame, a display or touch panel disposed on the first or second major surface.

14. The glass article of claim 1, further comprising:

the first major surface is concave and comprises a maximum radius of curvature of about 100 mm or greater;

the second major surface comprises a second CS region extending from the second major surface to a second depth of compressive stress ($DOC_2$), the second CS region having a second maximum CS value ($CS_{max2}$);

wherein the central tension (CT) region is disposed between the CS region and the second CS region having a maximum CT value ($CT_{curved-max}$).

15. An automotive interior system comprising:

a base; and a glass article according to claim 1 disposed on the base, and wherein, when an impactor having a mass of 6.8 kg impacts the first major surface at an impact velocity of 5.35 m/s to 6.69 m/s, the deceleration of the impactor is 120 g (g-force) or less.

16. The automotive interior system of claim 15, wherein the deceleration of the impactor is not greater than 80 g for any 3 ms interval over a time of impact.

17. The glass article of claim 1, wherein the thickness is from about 0.55 mm to about 2.0 mm.

\* \* \* \* \*